United States Patent
Van Cleave et al.

(10) Patent No.: US 10,407,835 B2
(45) Date of Patent: Sep. 10, 2019

(54) PROJECTOR FOR TRACK ALIGNMENT REFERENCE SYSTEMS

(71) Applicant: FOCUS POINT SOLUTIONS, San Marcos, CA (US)

(72) Inventors: Todd Van Cleave, San Marcos, CA (US); Larry Van Cleave, Grass Valley, CA (US)

(73) Assignee: FOCUS POINT SOLUTIONS, San Marcos ( * ) Notice: Subject to any disclaimer, the term of this patent is extended or adjusted under 35 U.S.C. 154(b) by 423 days.

(21) Appl. No.: 15/197,036

(22) Filed: Jun. 29, 2016

(65) Prior Publication Data

US 2017/0022672 A1  Jan. 26, 2017

Related U.S. Application Data

(60) Provisional application No. 62/196,471, filed on Jul. 24, 2015.

(51) Int. Cl.
| | | |
|---|---|---|
| *E01B 35/10* | (2006.01) | |
| *E01B 33/02* | (2006.01) | |
| *G01B 11/27* | (2006.01) | |

(52) U.S. Cl.
CPC .............. *E01B 35/10* (2013.01); *E01B 33/02* (2013.01); *G01B 11/272* (2013.01); *E01B 2203/16* (2013.01)

(58) Field of Classification Search
CPC .......... E01B 35/00; E01B 35/06; E01B 35/08; E01B 35/10; E01B 33/02; E01B 2203/16
See application file for complete search history.

(56) References Cited

U.S. PATENT DOCUMENTS

| | | | | | |
|---|---|---|---|---|---|
| 3,675,233 | A | * | 7/1972 | Bencsics | E01B 35/00 250/221 |
| 3,706,284 | A | * | 12/1972 | Plasser | E01B 27/17 104/7.2 |
| 3,750,299 | A | * | 8/1973 | Plasser | E01B 27/17 104/7.1 |
| 3,821,932 | A | * | 7/1974 | Theurer | E01B 33/02 104/7.2 |
| 3,922,969 | A | * | 12/1975 | Tyler | E01B 33/02 104/8 |
| 4,170,942 | A | * | 10/1979 | Theurer | E01B 27/023 104/12 |
| 4,184,266 | A | * | 1/1980 | Hurni | E01B 35/00 111/135 |
| 4,535,699 | A | * | 8/1985 | Buhler | E01B 27/17 33/287 |
| 4,538,061 | A | * | 8/1985 | Jaquet | G01B 11/306 104/7.2 |
| 4,724,653 | A | * | 2/1988 | Buhler | E01B 35/06 104/7.2 |
| 5,090,329 | A | * | 2/1992 | Theurer | E01B 27/17 104/7.1 |

(Continued)

*Primary Examiner* — Zachary L Kuhfuss

(74) *Attorney, Agent, or Firm* — Rimôn, P.C.

(57) ABSTRACT

Track alignment reference system projectors having a modulated light source, in addition to arrays of light sources, optionally utilizing a lens are provided. Track alignment systems that utilize or may make use of cascaded devices are also described. Related systems and methods are also provided.

12 Claims, 21 Drawing Sheets

(56) References Cited

U.S. PATENT DOCUMENTS

| | | | | |
|---|---|---|---|---|
| 8,794,812 B2* | 8/2014 | Coleman | ................... | F21S 8/04 |
| | | | | 362/606 |
| 9,518,845 B2* | 12/2016 | Lichtberger | ............ | E01B 35/00 |
| 9,777,440 B2* | 10/2017 | Carney | ................... | E01B 35/00 |
| 2006/0032063 A1* | 2/2006 | Tomasello | .............. | E01B 27/16 |
| | | | | 33/287 |
| 2015/0083013 A1* | 3/2015 | Carney | ................... | E01B 35/00 |
| | | | | 104/7.1 |
| 2015/0377653 A1* | 12/2015 | Lichtberger | ............ | E01B 35/00 |
| | | | | 356/73 |
| 2016/0273172 A1* | 9/2016 | Van Cleave | ......... | G01B 11/272 |
| 2017/0022672 A1* | 1/2017 | Van Cleave | ............ | E01B 35/10 |
| 2017/0106885 A1* | 4/2017 | Singh | ................... | B61L 23/044 |

\* cited by examiner

| Item # | Name |
|---|---|
| 1 | Housing |
| 2 | Incandescent bulb |
| 3 | Motor (AC or DC) |
| 4 | Chopper Disk |
| 5 | Lens |
| 6 | Collimation tube |
| 7 | Filter, Red, IR, etc. |

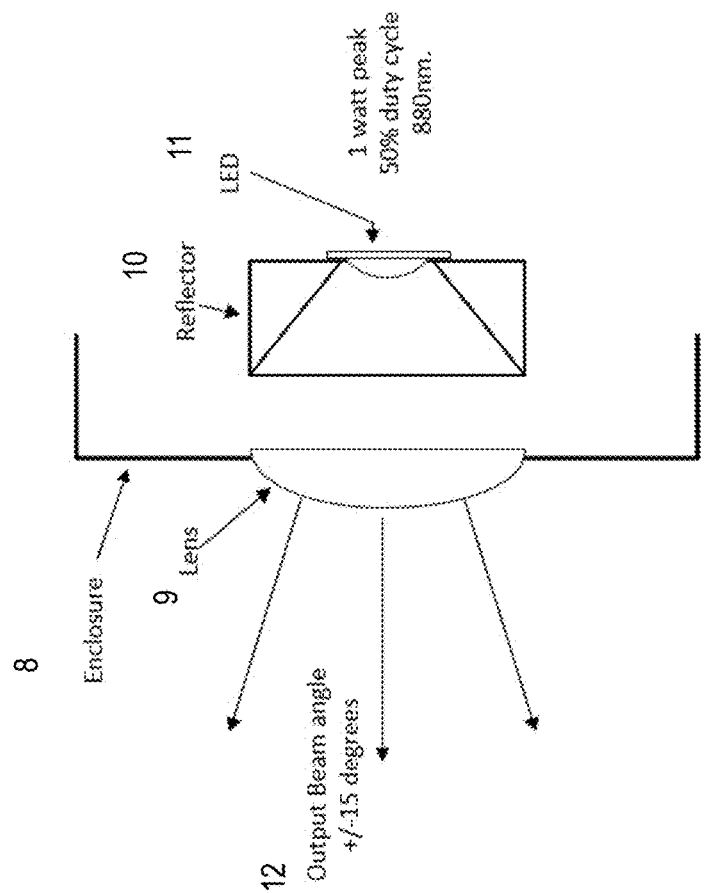

SDS Projector Prototype, Front

SDS Projector Prototype, Bottom

| Name | Item # |
|---|---|
| Housing employing heat sink capabilities | 8 |
| Lens, mounted adjacent to LED Array | 9 |
| Safety Light, Visible to operator | 13 |
| LED Array, 9 LED's in this example. Visible through lens | 11 |
| Mounting pattern same as Incandescent Projectors (4x bolts) | 14 |
| Power entry location | 15 |

FIG. 7
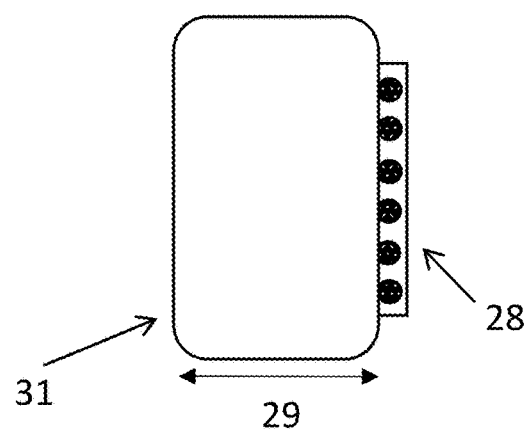
Liner Reference System
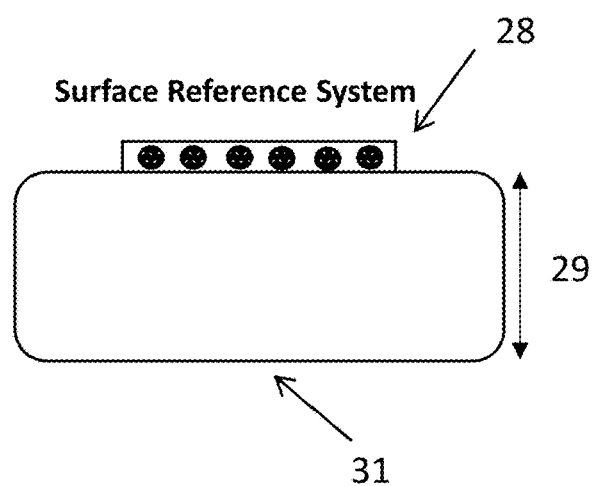
Surface Reference System
Projector, Round square or rectangular with a low aspect ratio
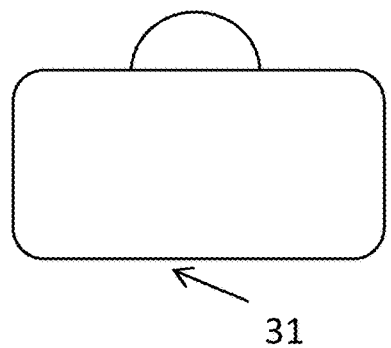

FIG. 10
Asymmetrical Beam Pattern
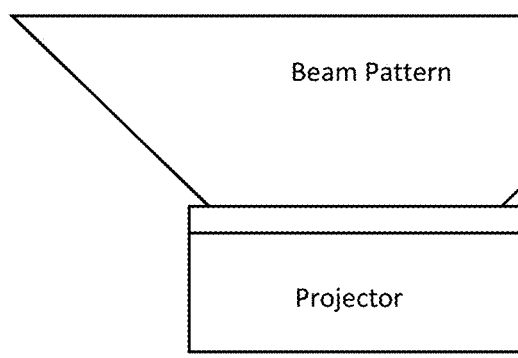
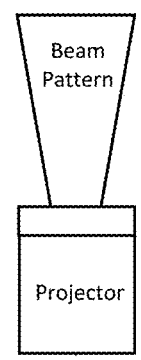
Projector Side View,
Wide Beam Pattern
Projector End View,
Narrow Beam Pattern
Symmetrical Beam Pattern
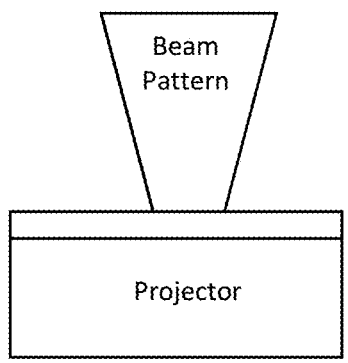
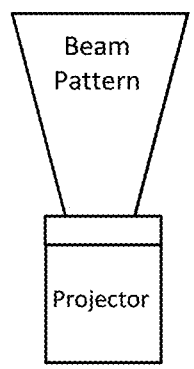
Projector Side View,
Narrow Beam Pattern
Projector End View,
Narrow Beam Pattern

PROJECTOR FOR TRACK ALIGNMENT REFERENCE SYSTEMS

CROSS-REFERENCE TO RELATED APPLICATIONS

This application claims priority to U.S. Provisional Patent Application No. 62/196,471, filed Jul. 24, 2015, the contents of which are hereby incorporated by reference in its entirety.

FIELD

The present improvements are directed toward railroad track MOW (Maintenance of Way) Equipment. More particularly, the present disclosure is in the area of track alignment machines that maintain, adjust, or measure railroad track alignment. In particular, the present disclosure is directed toward reference systems and their use, including receivers, projectors, and combinations of projectors and receivers used to measure track position.

BACKGROUND

The optical reference systems comprising shadow board reference systems and light mask reference systems have remained largely unchanged for over 30 years. Over this period of time industry has learned to accept the many challenges and limitations of these current systems including track misalignment do to projector failure or blockage, system interference from reference systems operating in the nearby vicinity or on adjacent track, safety hazards due to high intensity projector light sources interfering with machine operator's vision, etc. The present disclosure addresses these and other needs in the art to provide the efficiency and accuracy of these reference systems and to make the process of track alignment safer and more cost effective.

SUMMARY

In certain embodiments, a track alignment reference system projector is provided having a modulated light source. Frequently the light source in all embodiments comprises a light emitting diode (LED), though other light sources are contemplated. Often, the modulated light source operates at a carrier frequency of between at or about 500 Hz and at or about 1200 Hz, or higher. Often, the modulated light source operates at a carrier frequency of at or about 1200 Hz. Often, the modulated light source operates at a carrier frequency of between at or about 500 Hz or higher. Also often, the modulated light source operates at a frequency selected from a carrier frequency between the $2^{nd}$ and the $60^{th}$ harmonic of 1.2 KHz. Frequently, the modulated light source operates at a carrier frequency of about 24 kHz. In frequent embodiments, the modulated light source operates at an infrared wavelength of between about 700 and about 1100 nanometers The infrared light source often comprises a consumer infrared modulation carrier frequency. In frequent embodiments, the infrared modulation carrier frequency comprises between about 33 KHz to about 60 KHz. Also frequently, the modulated light source operates at a carrier frequency of between about 1.2 KHz to about 1 MHz.

In frequent embodiments, the modulated light source emits a signal comprising encoded data.

In certain frequent embodiments, a track alignment reference system projector having one or more light sources, or a linear array of two or more light sources, is provided. Often, such a projector is provided having a modulated light source as defined above and herein. Also often, one or more of the light sources comprises a modulated light source as defined above and herein. In frequent embodiments, the aspect ratio of the array is greater than 1.618:1. Often, the aspect ratio of the array is about 3:1. In frequent embodiments, the aspect ratio of the array is between about 1.618:1 to about 6:1. Often, the aspect ratio of the array is between about 1.618:1 to about 12:1. Also often, the aspect ratio of the array is between about 1.618:1 to about 20:1. In certain frequent embodiments the aspect ratio refers to the length versus the width of the portion of the projector housing the two or more light sources.

In certain frequent embodiments, a track alignment reference system projector having a single light source such as an LED is provided. Often, such a projector is provided having a modulated light source as defined above and herein. The aspect ratio of the single LED aperture is often at or about 1:1, with a significantly smaller aperture area as compared to larger LED arrays of various shapes and sizes.

In certain frequent embodiments, a track alignment reference system projector as defined above and herein is provided having a lens attached or adjacent to the light source positioned in the projector. Often, the lens is a total internal reflection lens. Frequently, the lens is attached to or adjacent to two or more light source components in the projector. Often, a single lens is attached to or adjacent to a single light source or an array of light source components in the projector. Frequently, the light source comprises a modulated light source.

In certain frequent embodiments, a track alignment reference system projector as defined above and herein is provided, wherein the light source is adapted to provide an asymmetrical beam pattern. Often, the aspect ratio of the asymmetrical beam is greater than 1.618:1. In frequent embodiments, the aspect ratio of the asymmetrical beam is about 3:1. Also frequently, the aspect ratio of the asymmetrical beam is between about 1.618:1 to about 6:1. Often, the light source that provides the asymmetrical beam pattern comprises a modulated light source.

In certain frequent embodiments, a track alignment reference system projector having a single light source such as an LED is provided. Often, such a projector is provided having either a symmetrical or asymmetrical beam pattern, often the aspect ratio of the asymmetrical beam is at or about 3:1, also often the aspect ratio of the symmetrical beam pattern is at or about 1:1.

In certain frequent embodiments, a track alignment reference system projector is provided as defined herein that wirelessly communicates with an external device, controller, one or more other projectors, one or more other receivers, the track alignment machine, or other device or sensor.

In certain frequent embodiments, a track alignment reference system projector is provided as defined above and herein, wherein the projector further comprises a receiver, including two or more receivers. Often, the projector wirelessly communicates with a receiver, one or more additional projector, an external device, or a controller.

In certain frequent embodiments, a track alignment reference system projector is provided as defined above and herein, wherein the projector comprises one or more infrared signal outputs, or a plurality of signal outputs.

In certain frequent embodiments, a track alignment reference system projector is provided as defined above and herein, wherein the projector comprises mounting points to provide for horizontal or vertical mounting.

In certain frequent embodiments, a track alignment reference system projector is provided as defined above and herein, wherein the light source is powered with a constant current power source.

In certain frequent embodiments, a system for use in rail track correction is provided, comprising: a track alignment reference system projector as defined above or herein positioned on a track alignment machine; a receiver disposed remotely from the projector; and a shadow board or light mask disposed between the projector and the receiver, wherein the shadow board or light mask is operable to block the light emitted from the projector device. Often, when the receiver receives light from the projector, the track alignment machine performs a lining or leveling operation. Also often, wherein when the receiver does not receive light from the projector, the track alignment machine does not perform, or stops performing, a lining or leveling operation.

In certain frequent embodiments, a method for use in rail track corrections is provided, the method comprising: emitting a modulated light beam having an intensity from the track alignment reference system projector as defined above or herein positioned on a track alignment machine; receiving light of substantially equal intensity and frequency at a receiver; triangulating a geometry of a section of track being worked; and comparing the geometry of the section of track being worked with a geometry of a previous section of track. Often, a shadow board or light mask is disposed between the projector and the receiver. Frequently, wherein when the receiver receives light from the projector, the track alignment machine performs a lining or leveling operation. Also frequently, when the receiver does not receive light from the projector, the track alignment machine does not perform, or stops performing, a lining or leveling operation.

In certain embodiments, a system for use in rail track correction is provided, comprising: a projector device positioned on a first rail vehicle, the projector device having a plurality of LEDs disposed adjacent to a lens wherein the projector device is adapted to emit a light beam having an intensity, and further wherein the light beam is modulated; a receiver pair disposed on a second rail vehicle, wherein each receiver of the receiver pair is adapted to receive light of substantially equal intensity and frequency from the projector device; and a shadow board disposed on the second rail vehicle, wherein the shadow board is operable to block the light emitted from the projector device. In certain embodiments, the second rail vehicle further comprises one or more work heads operable to lift a section of track during lining and leveling operations. In certain embodiments, when each receiver of the receiver pair receives light from the projector device, the one or more work heads lift and level the section of track. In certain embodiments, when the shadow board blocks the light emitted from the projector from being received within by each receiver of the receiver pair, the one or more work heads do not lift or level the section of track. In certain embodiments, the LEDs are arranged in a circular configuration within the projector device. In certain limited embodiments, the light emitted from the projector device may be modulated in a range of between about 50 Hz and 2200 Hz. In certain embodiments, each receiver of the receiver pair comprises one or more optical lenses and one or more optical filters positioned proximate to the optical lenses. In certain limited embodiments, the light intensity and frequency of wavelength of light received into each receiver of the receiver pair may be in a range of between about 50 Hz and 2200 Hz. In certain embodiments, the light intensity and frequency of wavelength of light received into each receiver of the receiver pair is substantially equal. In certain embodiments, the first rail vehicle and the second rail vehicle are spaced approximately 40' to 200' apart from each other. In certain embodiments, a method for use in rail track corrections is provided, the method comprising: providing a projector device on a first rail vehicle, the projector device having a plurality of LEDs disposed adjacent to a lens; providing a receiver pair on a second rail vehicle; emitting a modulated light beam having an intensity from the projector device; receiving light of substantially equal intensity and frequency at the receiver pair; triangulating a geometry of a section of track being worked; and comparing the geometry of the section of track being worked with a geometry of a previous section of track. In certain embodiments, a shadow board is provided on the second rail vehicle, wherein the shadow board is operable to block the light emitted from the projector device.

In certain embodiments, a system for use in rail track correction is provided, comprising: a track alignment reference system projector of having a modulated light source; and a receiver positioned on or adjacent to a track alignment machine, wherein the receiver is disposed remotely from the projector. Often in the contemplated systems, (a) when the receiver receives light from the projector, the track alignment machine performs a lining or leveling operation; or (b) when the receiver does not receive light from the projector, the track alignment machine does not perform, or stops performing, a lining or leveling operation.

In frequent embodiments, the system further comprises one or more remote device in communication with the projector or the receiver, each of the one or more remote device being separately selected from the group consisting of a projector, a secondary light source, a receiver, measurement device, a sensor, a reference marker, and a beacon. Often the communication comprises data communication via an optical signal or wireless data transmission. In frequent embodiments, the one or more remote device comprises a sensor in wireless data communication with the projector or the receiver.

In often included embodiments, the one or more remote device frequently comprises a cascaded device. Often, the cascaded device is (a) a forward projector, receiver, or projector/receiver combination device; (b) a rearward projector, receiver, or projector/receiver combination device; or (c) both (a) and (b).

BRIEF DESCRIPTION OF THE DRAWINGS

The skilled person in the art will understand that the drawings, described below, are for illustration purposes only.

FIG. 4 depicts a schematic of a cross-section of certain components of an exemplary projector.

FIG. 7 depicts an exemplary use of a light source with a shadow board.

FIG. 10 depicts asymmetrical and symmetrical beam patterns.

DETAILED DESCRIPTION OF THE VARIOUS EMBODIMENTS

Figure 1:
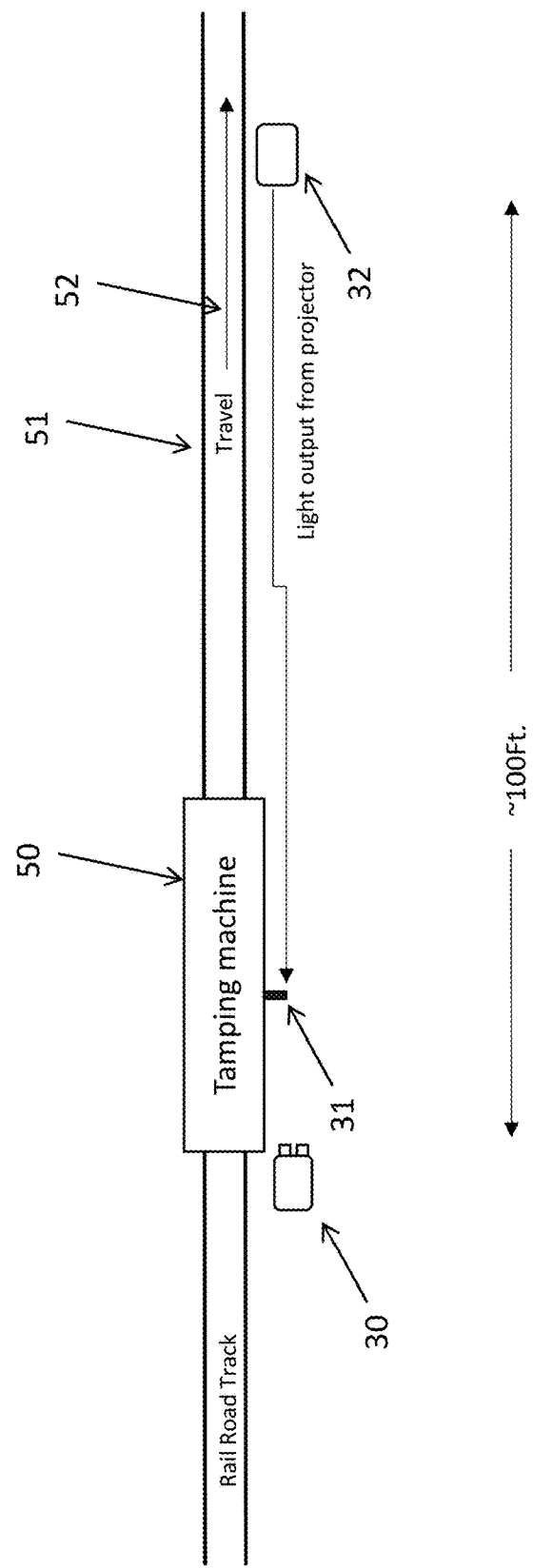
FIG. 1 depicts an exemplary reference system arrangement in conjunction with a track alignment machine.

For clarity of disclosure, and not by way of limitation, the detailed description of the various embodiments is divided into certain subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

As used herein, "tamping machine" or "ballast tamper" refers to a machine used to pack track ballast (e.g., gravel) under a railway tie or sleeper to support an elevation correction or to better support the loads imposed by a train. A "tamper-liner," "lining machine," or "tamping and lining machine" refers to a machine used to pack track ballast under a railway tie or sleeper to support an elevation correction or to better support the loads imposed by a train, and also correct the alignment of the rails to make them smoother and level in order to achieve a more comfortable ride for passengers and freight and to reduce the mechanical strain applied to the track structure by passing trains. Unless specifically indicated otherwise, each of the tamping-related terms and machines noted above is intended to fall within the scope of the term "track alignment machine," "alignment machine," or "machine," as used herein.

As used herein, "reference system" refers to a system designed to define a straight line (i.e., a "reference line") between two points in connection with the evaluation, positioning, or repositioning of the location of railroad track or its associated components such as ties, sleepers, or rail.

As used herein "reference cell" refers to an optical photo cell receiver assembly that monitors the presence of the reference system projector signal.

As used herein, "measurement cell" refers to an optical photo cell receiver assembly that measures the position of the shadow board shadow or light-mask light beam across its face.

As used herein, "optical signal receiver," "reference system receiver," and "receiver," are referred to interchangeably. A receiver is most frequently an optical receiver capable of processing or obtaining information from a light signal, frequently generated by a reference system projector.

As used herein, "reference system projector" and "projector" are referred to interchangeably. A projector is a device that generates a specific optical signal in terms of modulation, intensity, and/or beam angle to work with a reference system receiver.

As used herein, "output" refers to a signal related to an electrical signal or lack thereof, including related pathways and hardware, transmitted between a receiver or projector and a track alignment machine. Output also refers to hardware components that permit the transmission of such a signals and/or data to an alignment machine control system.

Since the mid 1960's the reference systems utilized in connection with railroad track alignment machines has been generally comprised of three components: receiver, projector, and shadow board, each mounted an approximate equal and/or controllable distance from the rail being measured. This system is generally used in lieu of the historic manual 62 ft. cord method for curvature measurement. The projector transmits a signal that is received by the receiver. Typically this signal has been a visible light signal. The arrangement of each part or component of the reference system provides a straight line of sight or a reference line to which the position of the rail can be compared. By moving one or more of the components, e.g., the shadow board or the receiver, the system can move along the track and "feel" or measure a series of locations that can be interpreted as track position. The track alignment machine can then calculate how much track movement is required and physically move the track to an improved position or return the track to its new or intended position (e.g., straight, curved, etc.).

There are three general types of reference systems in use today. Two employ optical systems and one relies on a more basic mechanical means: (1) shadow board reference system, (2) light-mask reference system, and (3) Wire reference system.

The shadow board reference system is an optical reference system that employs a shadow board to cast a shadow line across the reference system receiver photo cell. The reference system receiver may employ one (1) or two (2) photo cells. In all cases the position indicator is measured across a single photo cell. The reference system projector in these systems utilize a modulated light source typically operating with a frequency of about 500 Hz and about 1,200 Hz at an about 50% duty cycle.

The light-mask reference system is another optical-based reference system that employs a masking board with a slot cut through it to enable a light beam or light bar to pass through the masking board and illuminate the face of the reference system receiver photo cells. The reference system receiver used with this system utilizes a linear array of photo cells to capture the light beam as it moves back and forth across the array with track movement. The reference system projector used in these systems utilizes high intensity incandescent bulbs similar to aircraft landing lights or high beam automotive headlights with no modulation.

The Wire reference system does not rely on optical systems. Rather, this system makes reference measurements based on a wire stretched tight across the surface of the track.

Shadow board reference systems utilize a receiver. Since about 1967 these receivers have generally been single photo cell systems employing amplification with basic output signal control. The receiver collects light transmitted from the projector toward the receiver. The single output signal from this receiver corresponds to the position of the shadow board (shadow) on the face of the photo cell. This output has only two states; "see light from the projector" or, "Don't see light from the projector." The "don't see light" status occurs when the shadow board has adequately covered the receiver photo cell. The receiver is referred to as being at "Cutoff" when the shadow from the shadow board has covered just enough of the receiver photo cell to "Cutoff" the light from the projector and the receiver photo cell is no longer able to see the projector. An improved receiver was later developed that employed two photo cells. In these two photo cell receivers, generally the first photo cell is referred to as the Measurement cell and is used to capture the positional status of the shadow board as described above. The second photo cell, referred to as the reference cell, is used to monitor the projector status and provide additional receiver control. Projector status here refers, for example, to the projector signal that is monitored ensure it remains present and that light from the projector does not go out due to projector failure (Light bulb failure), blockage or interference (animals, machinery, personnel etc.), or environmental changes such as snow, dust, and fog. However, the previous two photo cell receivers did not make this reference cell information available as an output to the system. In addition, with regard to the solution detailed herein, prior shadow board reference system receivers have not utilized a dedicated output signal, nor a bi-state (Two color) status indicator to identify whether or not the light source (projector) is visible to the receiver (i.e., Status of the reference cell). Therefore, prior receivers have been unable to notify the track alignment machine of this failure, thereby failing to prevent unwanted track movement or recording during periods of time when the projector signal was not present.

As indicated herein, in a typical prior lining application, a receiver communicates with a track alignment machine control or operator, one of two statuses: (1) it sees the light (not at cutoff yet); or (2) it does not see the light (at or beyond cutoff). When the track alignment machine is in a work or correction mode, if the operator initiates a tamping and lining cycle to correct a track position, the machine will move the track outwards toward the (control rail) receiver at any time the receiver output is in the "see light" condition. The track alignment machine continues to move the track until a "cutoff" is reached and the receiver output goes to the "no-see" condition. If the receiver output is already in the "no see" condition, then the machine will move the track in the opposite direction until the cutoff position is crossed in the opposite direction. At which time, the movement will reverse until the cutoff is crossed from the "see light" condition. This ensures that track position is established upon reaching cutoff from only the "see light" condition. At this point track movement is stopped by the control system. Depending on the state of "see" or "no see" the track is always moved one way or another until the cut off position is reached. Therefore, a "see light" signal has traditionally resulted in movement of rail into the projector signal until a cutoff is reached. In contrast, a "no see" light signal has traditionally resulted in movement of rail out of the projector signal until a "see light" condition is reached, reverse direction and move once again back into the beam until cutoff is reached. FIG. 1 depicts one typical reference system configuration used in connection with a track alignment machine (50). A representation of a track alignment machine (50) is depicted as travelling in one direction (52) along a railway (51). An exemplary setup of a receiver (30), shadow board or light mask (31), and projector (32) is depicted. Though not intending to be limiting, one exemplary reference system position relative to track (51) geometry and a track alignment machine (50) is depicted in FIG. 1. When placed on the side of the machine it is generally controlling the Lining function (Track position left/right). And, when placed above the machine it is generally controlling the Surfacing function (Track position up/down).

Figure 2:
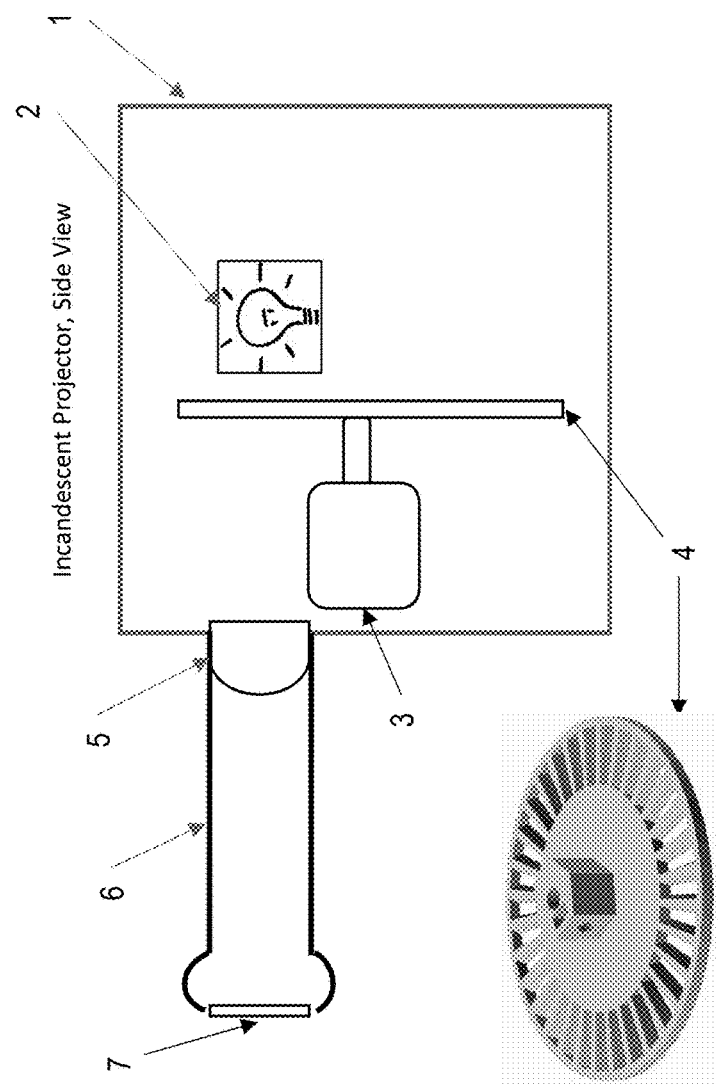
FIG. 2 depicts a schematic of a conventional reference system projector.

Projector for shadow board system: As shown in FIG. 2, historically the reference system projector used with the shadow board reference system uses a single modulated incandescent light source (2) within a housing (1). These projectors use, for example, an A/C or D/C motor (3) and a rotating chopper disk (4) to modulate the emitted light and direct it back toward the shadow board and reference system receiver through an optical lens (5), a collimation tube (6) and a filter (7). The standard reference system projector uses a frequency of between about 450 Hz and about 1,300 Hz, modulated at about a 50% duty cycle for the majority of shadow board reference systems. To date, both about 450-600 Hz and 1,000-1,200 Hz frequencies are in use in connection with the shadow board reference system. This frequency is not desirable, for example, as it requires extremely long period times which can result in excessive heat buildup within the light source.

Shadow board for shadow board reference system: The reference system shadow board is a solid panel that blocks light emitted from the reference system projector and keeps it from reaching the reference system receiver. The shadow board's position is controlled and its movement is measured as a way to determine the point at which the edge of the reference system shadow board interrupts the light being received by the reference system receiver. To effect movement, shadow boards are frequently connected with an electrical actuator featuring a screw-drive, for example, type movement and a potentiometer that relays an electrical signal to the track alignment machine defining position. In a typical embodiment, the main system controller moves the shadow board as needed to hunt the projector light beam, or change positions, or the operator can move the shadow board with a manual switch. In each of these cases, the shadow board is generally connected to a mechanical counter or electric interface so that the operator and computer "knows" its position. Often an electrical output or feedback from the receiver provides the signal to tell the system or computer when a cutoff has occurred. Surface systems operate similarly. For example, an electrical actuator often raises or lowers a receiver or shadow board, and electrical feedback from the actuator provides the signal to the computer, communicating a movement indication. Importantly, the shadow board movement determines extent of, or actual track movement required. The reference system determines when the reference line has been crossed, and when cutoff occurs.

The reference system shadow board casts a shadow line across the face of the reference system receiver (due to the light emitted from the projector contacting the board) as the edge of the reference system shadow board is moved in relation to the track position, or the receiver is moved in relation to the shadow board. Lining applications generally use a reference system shadow board that moves left and right (creating a vertical shadow line), where the movement and position of the reference system shadow board corresponds to horizontal track position. Surfacing applications often use a reference system shadow board that moves up and down representing the same track movement in the vertical direction, while other Surfacing applications will use a fixed or static reference board and a moving receiver corresponding to the same vertical track movement.

Receiver for light-mask reference system: The reference system receiver used on a light-mask reference system employs a photo cell array to capture the movement of a light beam passing through the reference system light-mask board. The linear array of photo cells and control logic enable a dynamic output signal that corresponds to the position of the light beam on the surface of the array. This system does not rely on a modulated light signal from the reference system projector to discriminate between the desired signal and undesired signals occurring in nature or as a result of reflections from other light sources. Instead, this system relies on high intensity light from the reference system projector to establish a "high" or "see light" threshold on the photo cell that is of sufficient magnitude to overcome most undesired signals. Therefore such conventional reference system receivers could still become susceptible to interference from any high intensity light source. For example, any bright modulated or unmodulated light source in the field of view could trigger this interference in a conventional receiver. As such, because there is a lack of modulation detection and a lack of discrimination between incoming signals other than light intensity in conventional systems, an high intensity signal (e.g., the sun, reflections, car headlights, or other undesirable high intensity light sources including high intensity sources with modulation) could interfere with the light-mask system and the track position in a conventional system.

Projector for light-mask reference system: The reference system projector used on light-mask reference systems is generally one or more high intensity incandescent white light bulbs. Generally, in a surfacing application, an array of three high intensity lights on each side of the machine is used. In lining applications, a single high intensity incandescent bulb is generally used. These bulbs are not intentionally modulated in any way and frequency response is not a design feature of this type of system. One of the various problems with this type of system is the use of very high intensity lights, which interfere with the sight of the track alignment machine operator and give rise to related consequential safety hazards, especially at night.

Light-mask board for light-mask reference system: The light-mask board used on light-mask reference systems performs a similar function as the shadow board on the shadow board reference system, except that the light-mask board uses a solid panel with a slot cut into it to block light from the reference system receiver except in the desired location. The slot is cut into the light-mask board, permitting a defined light beam or light bar to project onto the surface of the reference system receiver photo cell array. As either the reference system light mask board or reference system light mask receiver is moved the resulting light beam or light bar will also move across the surface of the reference system receiver.

Figure 3A:
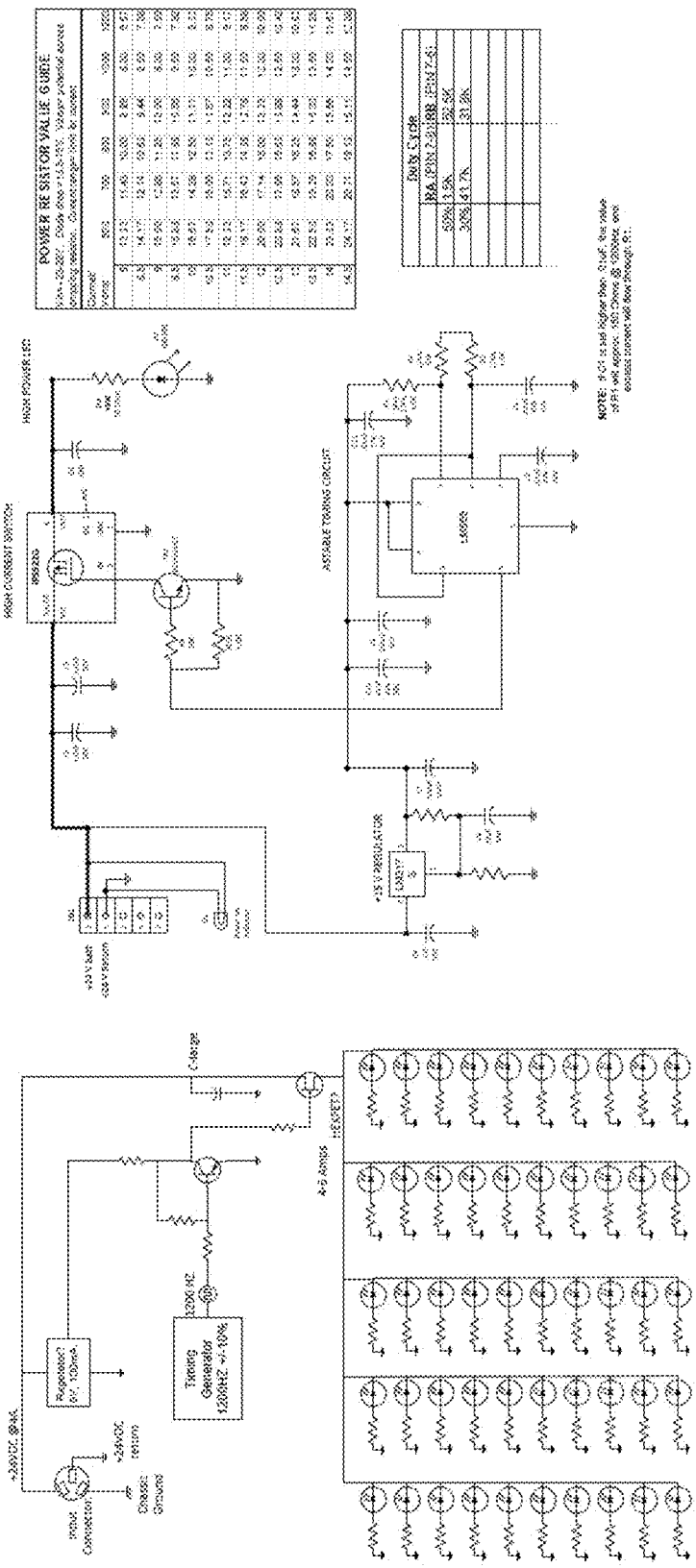
FIG. 3A depicts block diagrams of an exemplary projector embodiment.
Figure 3B:
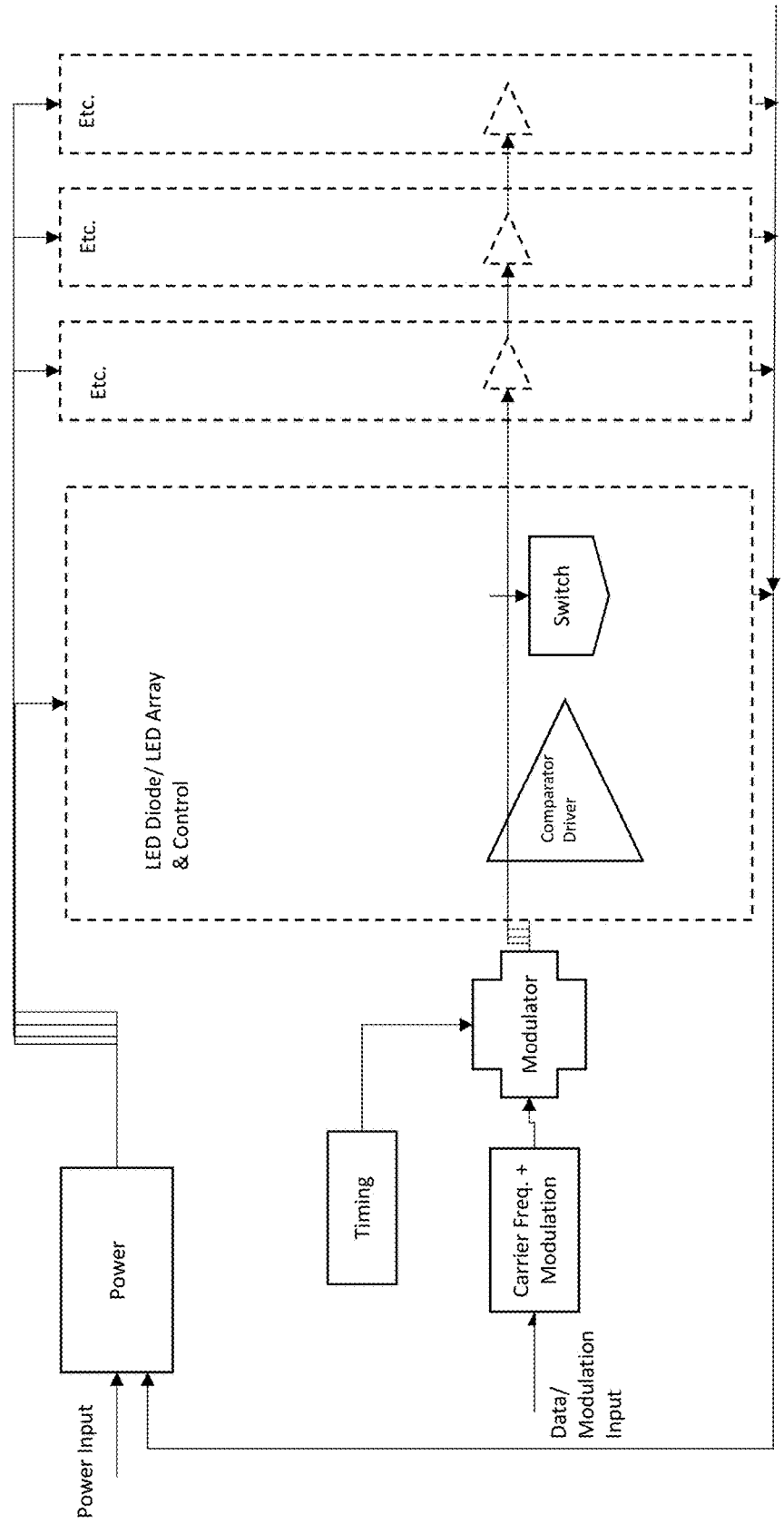
FIG. 3B depicts block diagrams of an exemplary projector embodiment.

With reference to FIG. 3A, block diagrams for certain embodiments of improved projectors are provided. In such embodiments, multiple IR LEDs are positioned adjacent to a lens, and the LEDs are optionally modulated at, for example, about a 50% duty cycle at a rate of about 1200 Hz. FIG. 3B depicts a block diagram of another embodiment, including constant current control for LEDs and LED arrays, and data input/modulation blocks. Use of constant current ensures, for example, consistent light output from the projector regardless of LED age or voltage input variations. This provides a consistent signal output for the life of the projector. Previous projectors used light sources connected directly to track alignment machine power, therefore any variation in machine power would have a direct impact to the light output from the projector consistent with the variation in power. If machine power (voltage) increased, light intensity would increase. Likewise, if the machine power decreased, light intensity would decrease resulting in measurable differences in reference system accuracy and overall performance.

Figure 5:
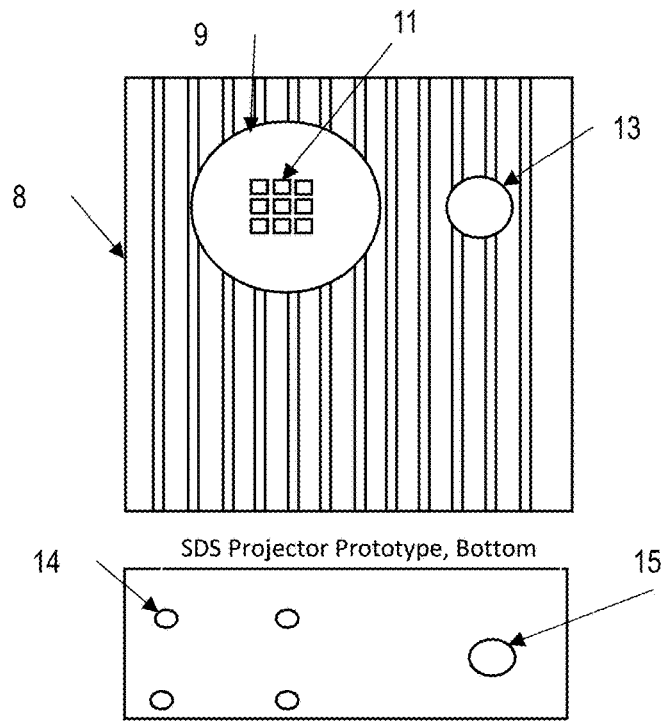
FIG. 5 depicts front and bottom schematic views of an exemplary projector.

FIG. 4 provides a side view of an exemplary light source and lens arrangement. Within housing (8) optionally having heat sink capabilities, an LED source or array (11) is provided with a reflector (10) to capture and collimate LED light output. A lens (9) is positioned in the light path to modify the output beam angle (12). In one embodiment, 9 LEDs are provided; packaged LED arrays also support 3 LEDs (e.g., OD-663), and 6 LEDs (e.g., OD-666), though other LED wavelengths (e.g., between about 650 nm to about 1000 nm) and configurations (e.g., different number of LEDs and/or LED wavelength selections) are contemplated. The lens further improves light output beam angle, for example, in a manner that can mimic the output of existing reference system projectors. Another view of the embodiment of FIG. 4 is provided in FIG. 5.

Figure 6:
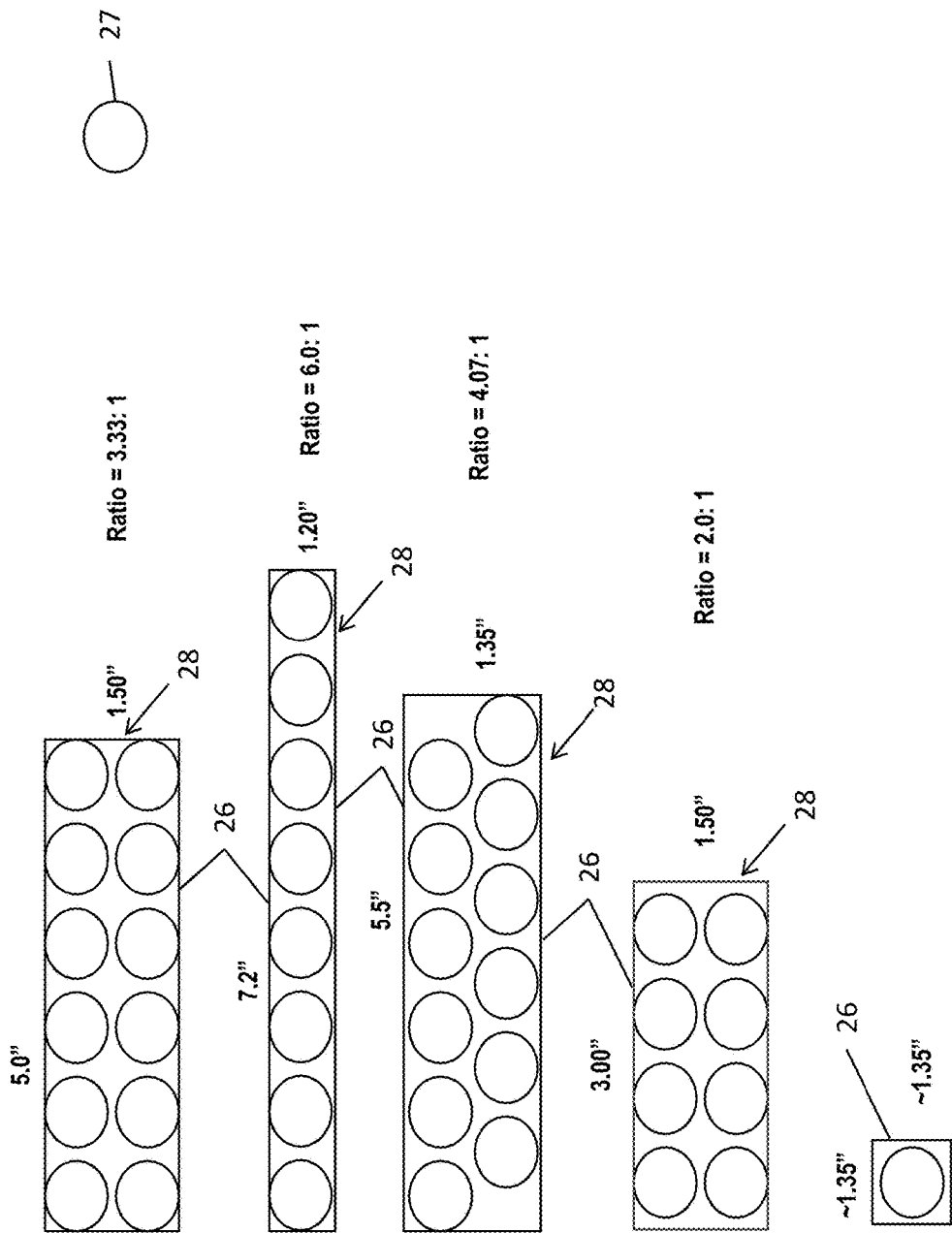
FIG. 6 depicts various light source array configurations.

With reference to FIG. 6, exemplary light source (e.g., LED) (27) array (28) configurations are depicted. Lines or groupings of light sources (27) (including lenses) are provided as arrays (28) within a housing (26). A single LED (27) in a housing (26) is also depicted. As referred to herein, these are often referred to as a line array (28). In frequent embodiments, the light source or array of light sources is characterized by a dimension that is narrow and elongate such that it is referred to as longer than it is wide, or wider than it is long. The housing (26) may be any variety of configurations, including rectangular, square, circular, etc. Such exemplary arrangements are depicted in FIG. 6. Often, the aspect ratio is about or grater that phi (i.e., 1.618:1). Often, the aspect ratio is about or greater than 2:1. Often, the aspect ratio is about or greater than 3:1. Often, the aspect ratio is about or greater than 3.33:1. Often, the aspect ratio is about or greater than 4:1. Often, the aspect ratio is about or greater than 5:1. Often, the aspect ratio is about or greater than 6:1. In certain embodiments, the aspect ratio is between about 1.618 to about 6:1. In certain embodiments, the aspect ratio is between about 3:1 to about 6:1. In certain embodiments the aspect ratio is about 7:1, 8:1, 9:1, 10:1, 11:1, 12:1, 13:1, 14:1, 15:1, 16:1, 17:1, 18:1, 19:1, 20:1. In certain embodiments the aspect ratio is between about 1.618:1 to about 20:1. In certain embodiments the aspect ratio is between about 2:1 to about 20:1. In certain embodiments, the aspect ratio is between about 3:1 to about 20:1. In certain embodiments, the aspect ratio is between about 3:1 to about 12:1. In certain embodiments, the aspect ratio is between about 12:1 to about 20:1. In certain embodiments the width (i.e., smallest dimension of the array) is about or less than or equal to 2.5". Often, the width is about or less than about 2.25". Often, the width is about or less than about 2.0". Often, the width is about or less than about 1.75". Often, the width is about or less than about 1.5". Often, the width is about or less than about 1.25". Often, the width is about or less than about 1.0". When a single light source, such as a single LED is employed, often the housing is provided with an aspect ratio of at or about 1:1.

In certain, less frequent, embodiments the light sources are positioned in a round housing. Optionally, in such embodiments, the aspect ratio of the light source or arrangement thereof in such embodiments is often at or greater than 1.618:1.

With reference to FIG. 7, a line array (28) is depicted in use together with a shadow board (31) reference system. In this exemplary embodiment, the line array (28) is positioned such that the longer dimension of the line array is parallel to the shadow board (31) edge, and perpendicular to the intended operational use. Operational use may vary depending on the application. For example, lining operations move track horizontally left and right, so the projector is placed with the long axis vertical in such applications. In turn, surfacing operations move the track in elevation, and so the projector is oriented with the long axis horizontal. Such orientations provide a narrow projector aperture relative to the shadow board edge (measurement plane), thus minimizing shadow board travel (29) distance to make a measurable difference in received signal strength at the reference system receiver, and minimizing the distance the shadow board must travel to establish either the "see light" or "no see light" (i.e., signal or no signal) condition at the reference system receiver. In contrast, low aspect ratio projectors often require larger shadow board movement to cover enough of the projector aperture to provide for a similar reduction in light intensity at the receiver and to create the "see" or "no see" condition, often resulting in less measurement resolution and less accuracy. In embodiments employing a single LED light source, the single LED is oriented in a similar manner relative to the planned or expected shadow board movement.

Figure 8:
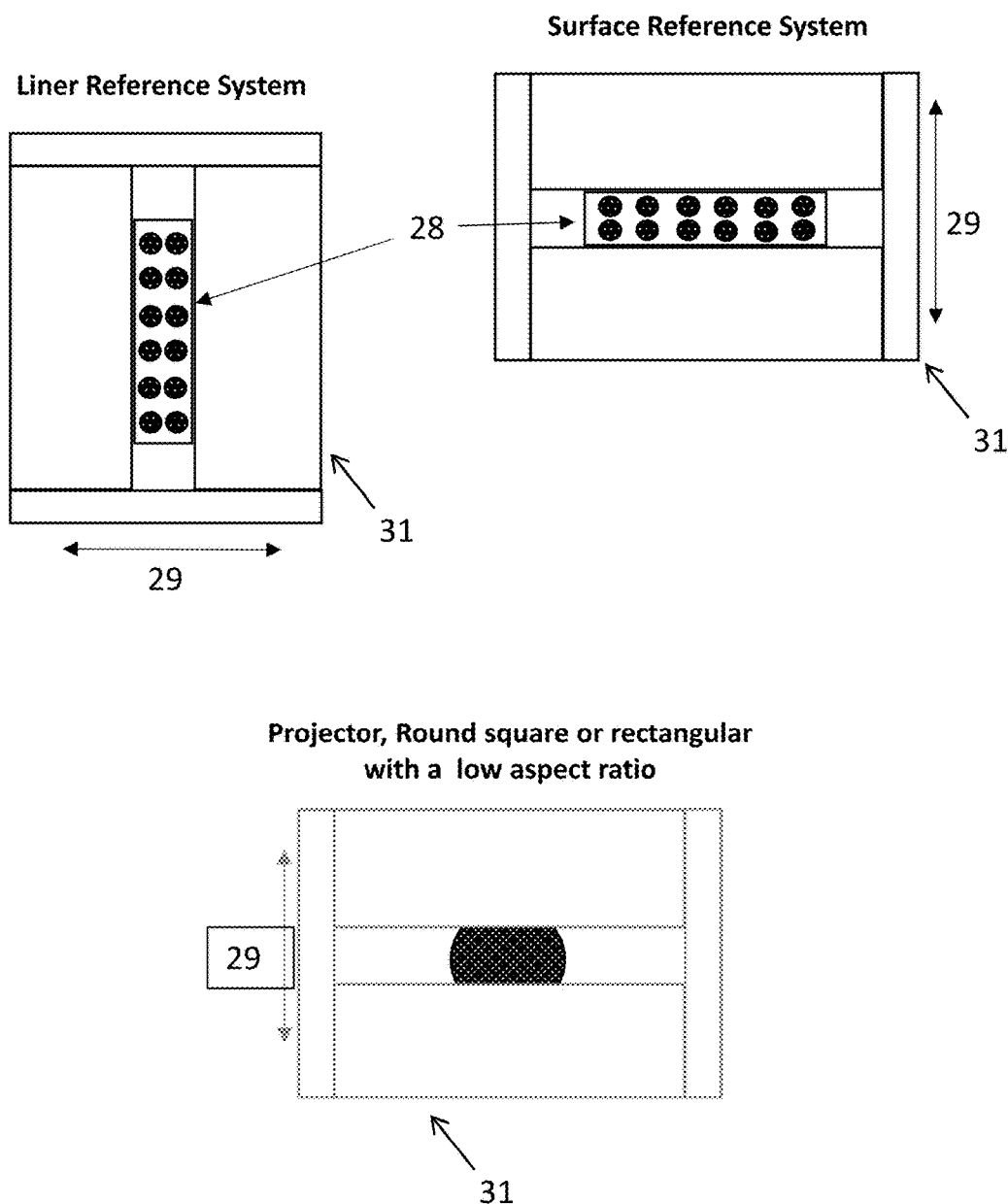
FIG. 8 depicts an exemplary use of a light source with a light mask.

With reference to FIG. 8, a LED line array (28) orientation is shown with a light mask (31) Reference system and positioned to place the longer dimension of the line array parallel to the light mask edge, and perpendicular to the intended operational use. As noted above in connection with FIG. 7, horizontal or vertical orientations of the long axis of the projector often depend on the lining or surface operation. Such orientations provide a narrow projector aperture relative to the light mask edge (measurement plane), thus minimizing light mask travel (29) distance to make a measurable difference in received signal strength at the reference system receiver, and minimizing the distance the light mask must travel to establish either the "see light" or "no see light" (i.e., signal or no signal) condition at the reference system receiver. In contrast, low aspect ratio projectors often require larger light mask movement to cover enough of the projector aperture to provide for a similar reduction in light intensity at the receiver and to create the "see" or "no see" condition, often resulting in less measurement resolution and less accuracy. In embodiments employing a single LED light source, the single LED is oriented in a similar manner relative to the planned or expected light mask movement.

Figure 9:
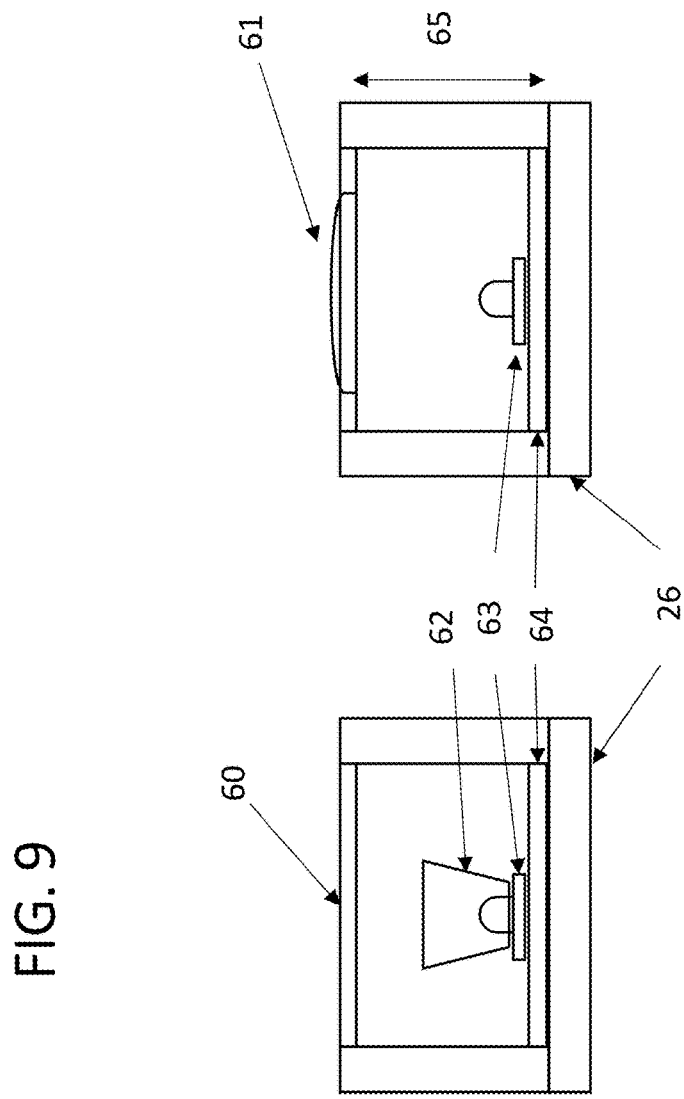
FIG. 9 depicts various contemplated lens configurations and arrangements relative to a light source.

With reference to FIG. 9, an exemplary lens (62) is attached directly to the light source (63) (e.g., LED/PB). In certain embodiments where the lens (62) is placed immediately adjacent or attached to the light source, such an arrangement often provides enhanced optical alignment that enables greater light control (i.e., more consistent and refined beam patterns) and greater light output levels (i.e., improved efficiency) compared with lenses placed at a distance (61) from the light source. This is often the case when the attached lens (62) is a total internal reflection (TIR) lens. In FIG. 9, the TIR lens is directly mounted to LED/PCB (63/64), providing efficient and accurate light collection and control of an emitted signal from the light source such as an LED or LED array. In certain embodiments, one TIR lens is used for each individual light source (e.g., LED). In certain embodiments, one TIR lens is used to support a single array such as a line array of light sources (e.g., LEDs). In the later embodiment, often a single package is provided having a plurality of light sources embedded within the single device. In certain embodiments, a combination of multiple light sources and a single lens are provided together with 1:1 ratios of other light sources with lenses. Such of these embodiments can be a combination array having both configurations. Often, a combination reflector & Lens assembly is provided mounted in a similar fashion (i.e., directly to the LED/PCB) to improve alignment and optical efficiency. The inventors have found that separating the lens (62) and optical window (60) function, provides for a decrease in design complexity, cost of future repairs, and increase in manufacturability. Often, when a lens is used that is attached to the housing (26) or at a distance from the light source, mechanical stack-up tolerances (65) should be accounted for to provide for accurate alignment between the light source and the lens. Misalignment often causes misdirected light signals and inaccuracies in the system.

FIG. 10 depicts the use of asymmetrical beam patterns or "Bar of light" where the height and width of the beam pattern approach an aspect ratio of greater than 1. Frequent projector embodiments herein provide a narrow aperture for light transmission. Moreover, it is also often desirable in certain embodiments to provide an asymmetrical beam pattern to enhance reference system operation. Asymmetrical patterns often improve the performance of LED based reference systems when used, for example, in certain types of machine operations where a single Projector is provided to support multiple receivers mounted in distinctly different locations on the machine (i.e., track alignment machine), and where greater signal from the projector is required. For example, a single projector is mounted in the center point of a reference system, (located above one rail, or centered between the two rails), and received by two spatially-displaced receivers. As such, a signal transmission triangle is created. One side of the triangle is created between the Projector and the first receiver; a second side of the triangle is created between the Projector and the second receiver. The third side of the triangle comprises the distance between the two receivers. An asymmetrical beam pattern from the projector is often preferred to enhance signal transmission when the difference in the length of the first and second sides exists. An asymmetrical beam pattern is also often used to support slot-board type reference systems (e.g., including the Jackson proportional system). In such embodiments, having a projector beam pattern or signal that is wider in one axis to better illuminate receivers placed at distances (often great distances) from each other, and from the center of the beam pattern. Often, receivers are placed an equal distance from the projector, but at relative distance between the receivers (i.e., on each side the alignment machine). This is often the case for surfacing applications where, for example, a single projector is placed in the middle of the track at a forward portion of the alignment machine, and two receivers are mounted, one above each rail. In certain embodiments, for example those employing a single LED light source, the beam pattern may be symmetric or asymmetric.

Figure 11:
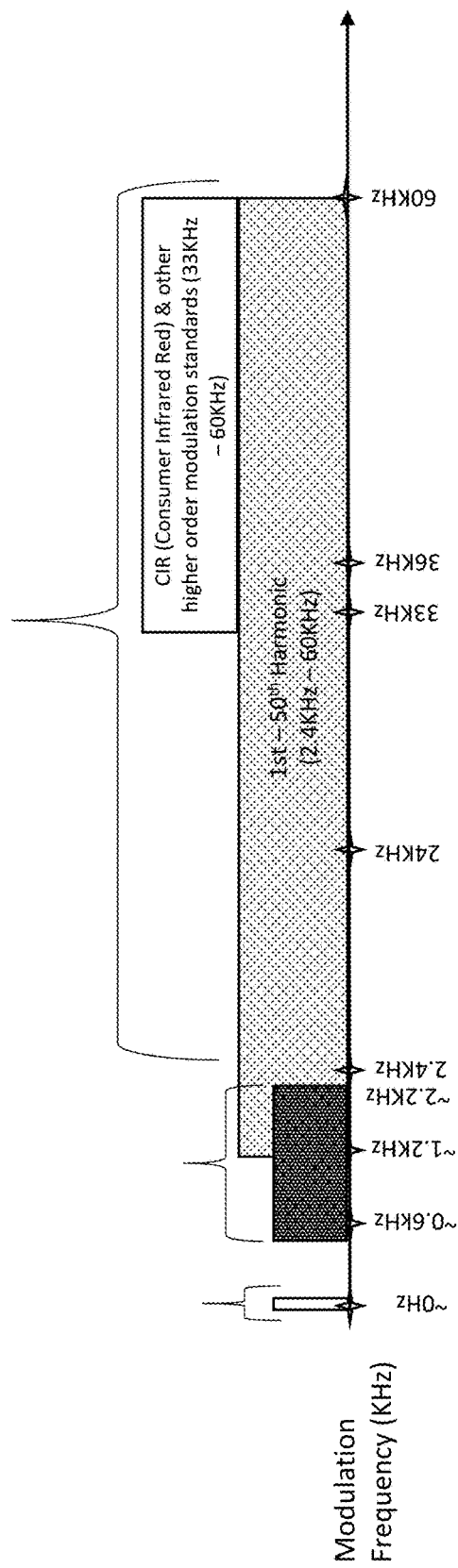
FIG. 11 depicts projector modulation frequencies.

FIG. 11 depicts certain projector modulation frequencies. Often, the light source provides an output frequency of at or about 1200 Hz, or between about 500 Hz and 1200 Hz. Also often, a single LED light source is utilized that provides an output frequency of at or about 1200 Hz. In certain embodiments, projectors of the present disclosure provide an output signal at a modulation rate of between the 2nd and 60th harmonic of 1200 Hz, in other words, modulation or an output signal between about 2.4 KHz to about 60 KHz. In certain embodiments, the modulation rate of the output signal is 24 KHz. In certain embodiments, the modulation rate of the output signal is between about 2.4 KHz to about 24 KHz. In certain embodiments, the modulation rate of the output signal is between about 12 KHz to about 24 KHz. In certain embodiments, the modulation rate of the output signal is between about 2.4 KHz to about 32.4 KHz. In certain embodiments, the modulation rate of the output signal is between about 2.4 KHz to about 33 KHz. In certain embodiments, the modulation rate of the output signal is between about 33 KHz to about 60 KHz. In certain embodiments, the modulation rate of the output signal is between about 33.6 KHz to about 48 KHz. In certain embodiments, the modulation rate of the output signal is between about 33.6 KHz to about 60 KHz. In certain embodiments, the modulation rate of the output signal is at or above 2.4 KHz and below an infrared frequency. In certain embodiments, the modulation rate of the output signal is within the range of 33 KHz to 60 kHz, used for infrared frequency modulation rates. Often as used herein, the term infrared refers to consumer infrared modulation frequency ranges. Often, when infrared frequencies are utilized, optionally the signal is employed containing data encoding to provide data transfer from the projector to the receiver, the receiver/alignment machine to the projector, or between multiple receivers (see, e.g., FIG. 12A).

Figure 12A:
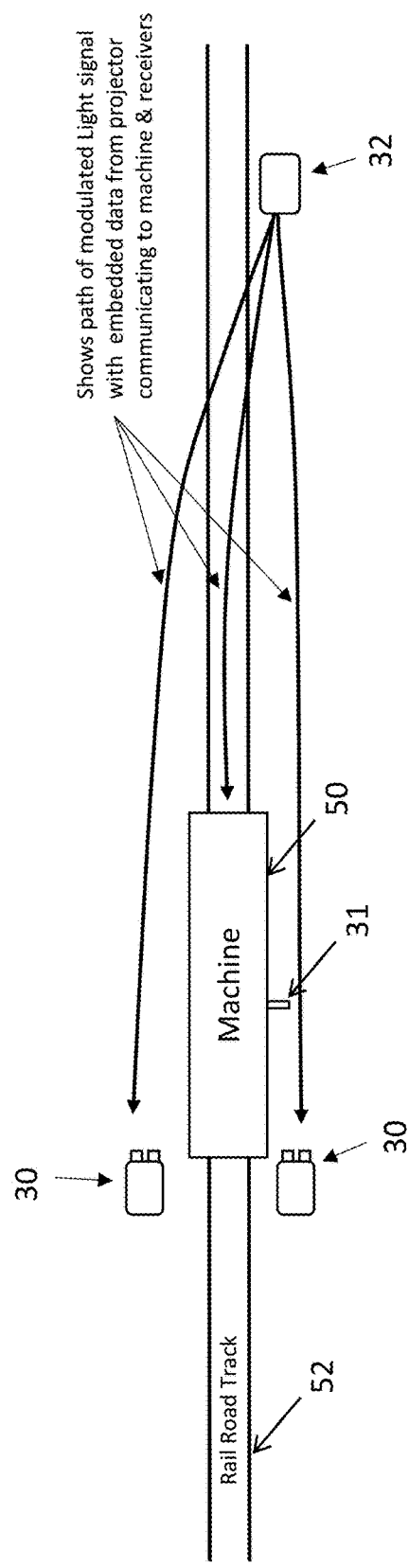
FIG. 12A depicts an exemplary component layout of a reference system.

FIG. 12A depicts a representation of a track alignment machine (50) on a railway (51). An exemplary setup of a receiver(s) (30), shadow board or light mask (31), and projector (32) is depicted. The arrows depict a general representation of the direction or path of light from the projector (32) to the receivers (30). Though not depicted, a receiver (30) may be included on the front or top of the track alignment machine (50).

Figure 12B:
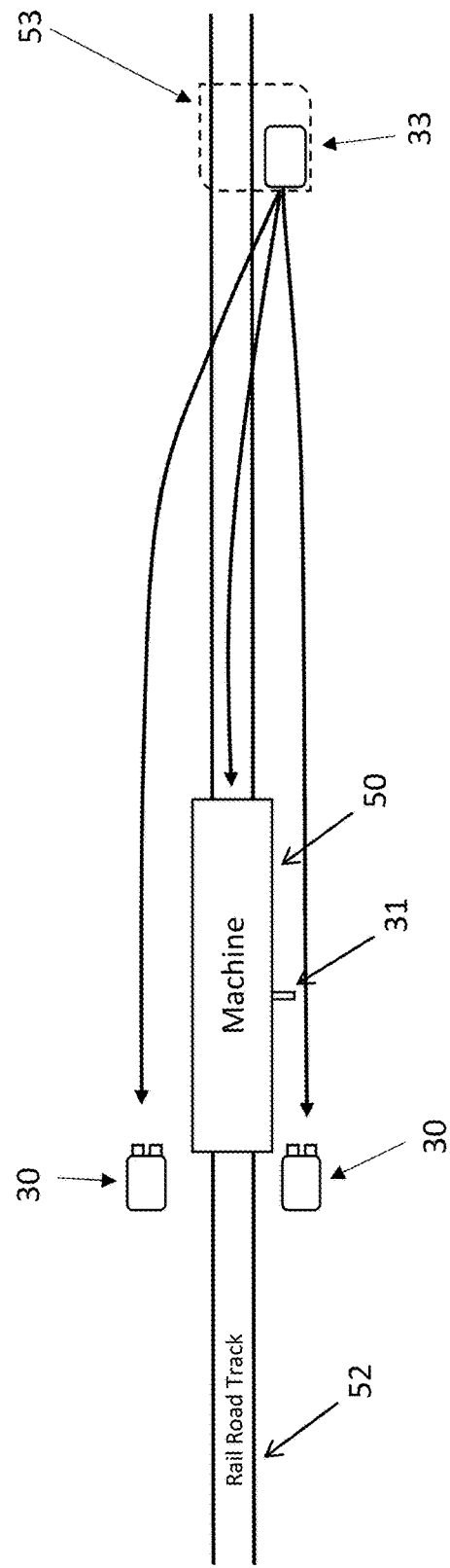
FIG. 12B depicts an exemplary component layout of a reference system.

As another embodiment, FIG. 12B employs a fixed remote battery powered projector (33) for the purpose of operating the track alignment machine (50) toward a fixed immovable object such as a street crossing, switch, bridge, etc. Such an embodiment often employs a projector mounted on a remote or mobile apparatus (53) separate from the machine, thus providing for remote mounting and optional placement in a fixed location. Often, such an apparatus is battery powered. The apparatus (53) is most frequently mobile and movable relative to the machine (50) or machine's movements. Often, the apparatus (53) is mobile at a fixed distance or known location relative to the machine (50) such that as the machine (50) moves, the apparatus (53) moves in a corresponding manner relative to the machine. Thus, in such embodiments, at any time during the movement of the machine the location (including approximate location) of the apparatus is known. In other embodiments, the mobile apparatus (53) to be sent to or positioned at a known location relative to the machine or section of track (52) and then does not move when the machine (50) moves. In any event, in such various embodiments, position alignment information is communicated to the machine during movement of the machine, or mobile and movable separate from machine movements, as necessary where position alignment information is communicating to the machine (50) from the light source on the apparatus (53), for example, via interfaces exemplified in FIGS. 13 and 14.

LED projectors use significantly less power (current) than incandescent projectors, which permits the use of power sources such as reasonably sized batteries and placement at remote locations and distances from the machine. Often street crossings or switches are fixed features in the track and cannot be moved. Therefore all track corrections must occur going into and out of such fixed locations. By placing the projector in a fixed location, switch, crossing, bridge, etc., the machine can now "work" or move the track toward the fixed location. A remote projector which can be fixed in a specific location eases such operations and increases the flexibility in where/how the projector can be used. Remote battery powered projectors can be used at any angle and distance from the track alignment machine, as needed. Though FIGS. 12A and 12B depict a single projector, it is intended to represent a broader disclosure. In particular, multiple remote projectors are often employed, allowing simultaneous use of Lining, Surface, and other track side reference point measurements systems in connection with other features and apparatus described herein.

In systems employing higher order modulation, the carrier frequency or the signal carrying the desired modulation may be any frequency necessary to support the desired modulation, and typically is on the order of 5-25 times the base modulation rate. As such, carrier frequencies can approach or exceed 1 MHz. Though not wishing to be bound by any particular theory of operation, higher modulation frequencies have shorter period times and therefore shorter "LED on time" (Per cycle). This is important for LED based Reference System Projectors where the longer LED on times (period times) result in greater LED die temperature during the "On time" that can negatively impact the longevity of the LED itself.

Certain examples of higher order modulation include: FM, phase shift, pulse wave modulation, pulse position modulation, biphase/manchester encoding, amplitude-shift keying, CIR (Consumer IR) employing modulation standards such as RC-5, RC-6, REC-8-, NEC, Sharp ASK, TV Remote, or IrdA (Infrared Data Association) standards including physical layer, link access, and management protocols. The use of modulation, and the ability to change modulation rates or coding schemes is also contemplated to isolate one Reference System from another by means of selectively changing the base coding, modulation rate, or synchronization timing between systems. Isolating such systems often reduces the cost and complexity of the alignment machine operation and improves productivity by reducing or eliminating light blocking curtains, and minimizing machine performance issues due to such isolation conditions where unexpected reflections or signals from nearby surfaces, structures, or adjacent Reference systems are in use.

Figure 13:
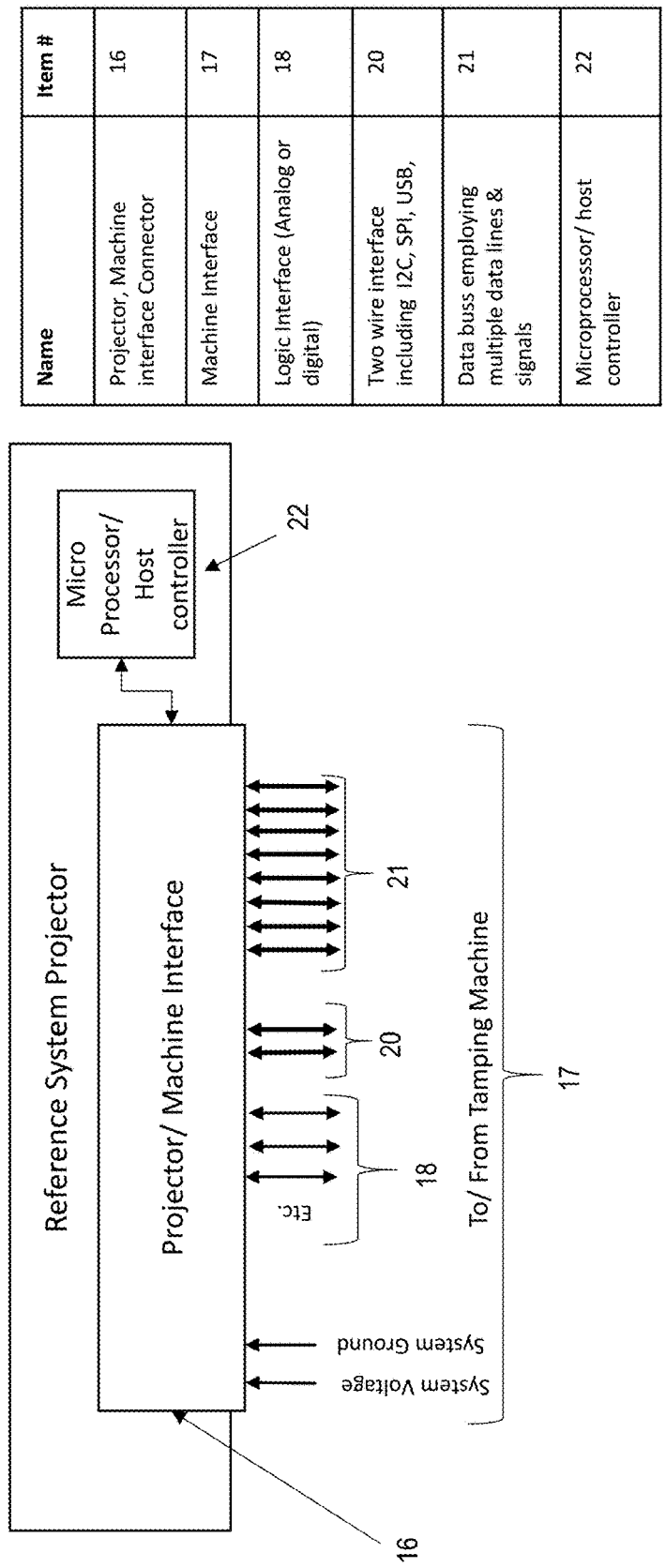
FIG. 13 depicts a functional layout of an exemplary reference system projector.

FIG. 13 depicts a functional layout of an exemplary reference system projector, including certain representative features or components. Outputs often include any type of parametric, telematic, or diagnostic information to support expanded Reference System functionality, including support for a host system interface and/or master controller and signals. Inputs are described to include, for example, host system controllers and indicators (e.g., from alignment machine; receiver or any other associated equipment; remote receivers; cascaded systems/subsystems; remote sensors such as temperature sensors, laser alignment sensors, audio, video, GPS, IR sensors, wireless sensors and communication devices, acoustic sensors, mechanical movement & position sensors; etc). A variety of inputs and outputs provides for the collection of data for use by the alignment machine via localized host controllers & processor systems embedded within the projector assembly to enhance system function, capability, accuracy, and/or efficiency. Any number of signals I/O's are contemplated, and signal formats may include: Analog, Digital logic (high/low), Serial, parallel, two-wire (I2C, SPI, USB, etc.), etc.

Figure 14:
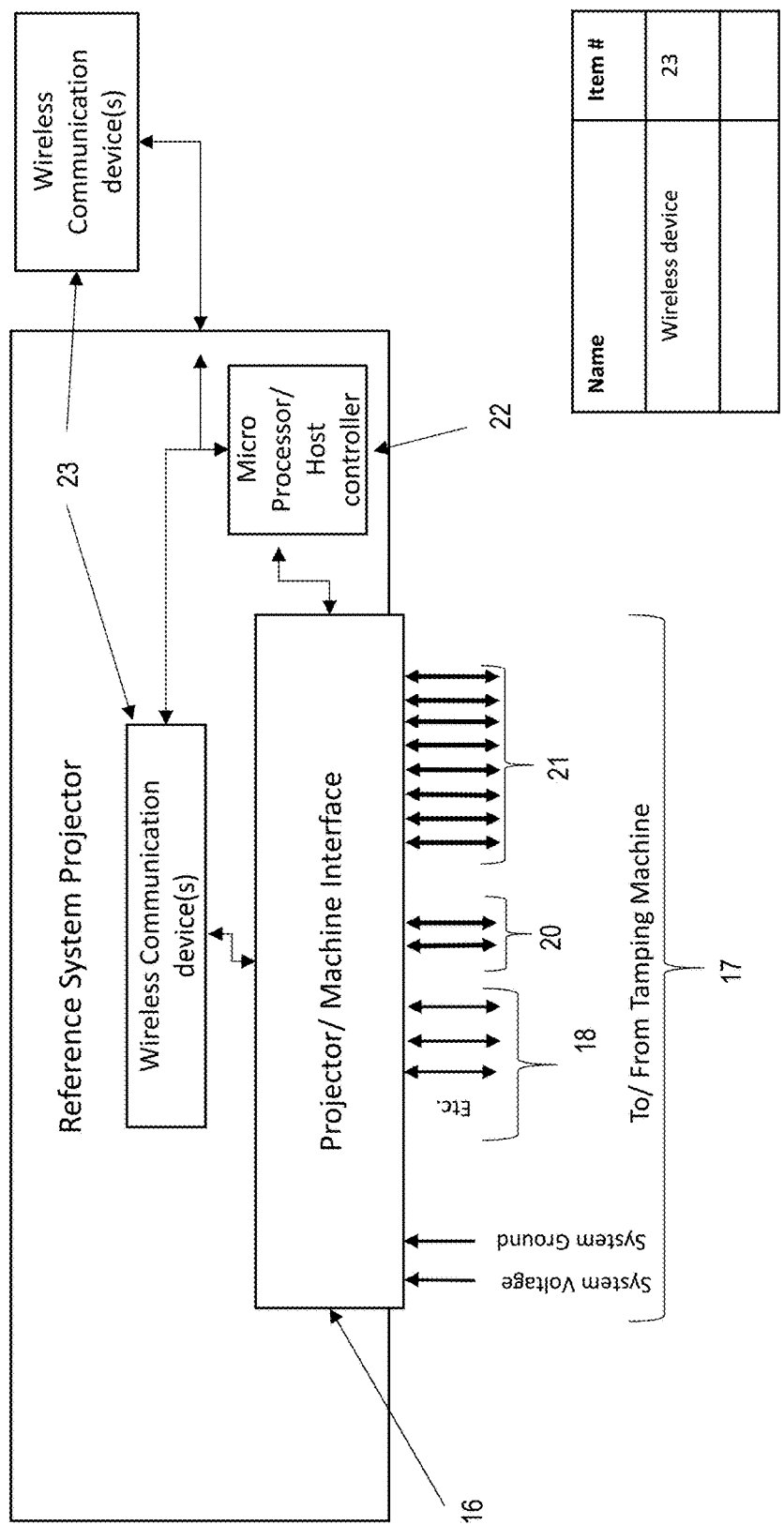
FIG. 14 depicts another functional layout of an exemplary reference system projector.

As depicted in FIG. 14, in certain embodiments, wireless communication capability is provided (module, card, modem, etc.) to the reference system projector for the purpose of transferring data between the projector and machine, or the projector and any number of remote wireless accessories, remote sensors, remote measurement systems, in, on, and surrounding the machine and within wireless range often including other machines. Often, as wireless devices utilize RF signals, it is contemplated that that the wireless portion (23) may be provided outside the housing of the projector, for example, to improve RF reception from the wireless antenna. Any number of signal I/Os are contemplated between the wireless device and the projector. Signal formats may include, for example, analog or digital logic (high/low), serial, parallel, and two-wire interfaces such as (I2C, SPI, USB, etc.), etc.

Figure 15:
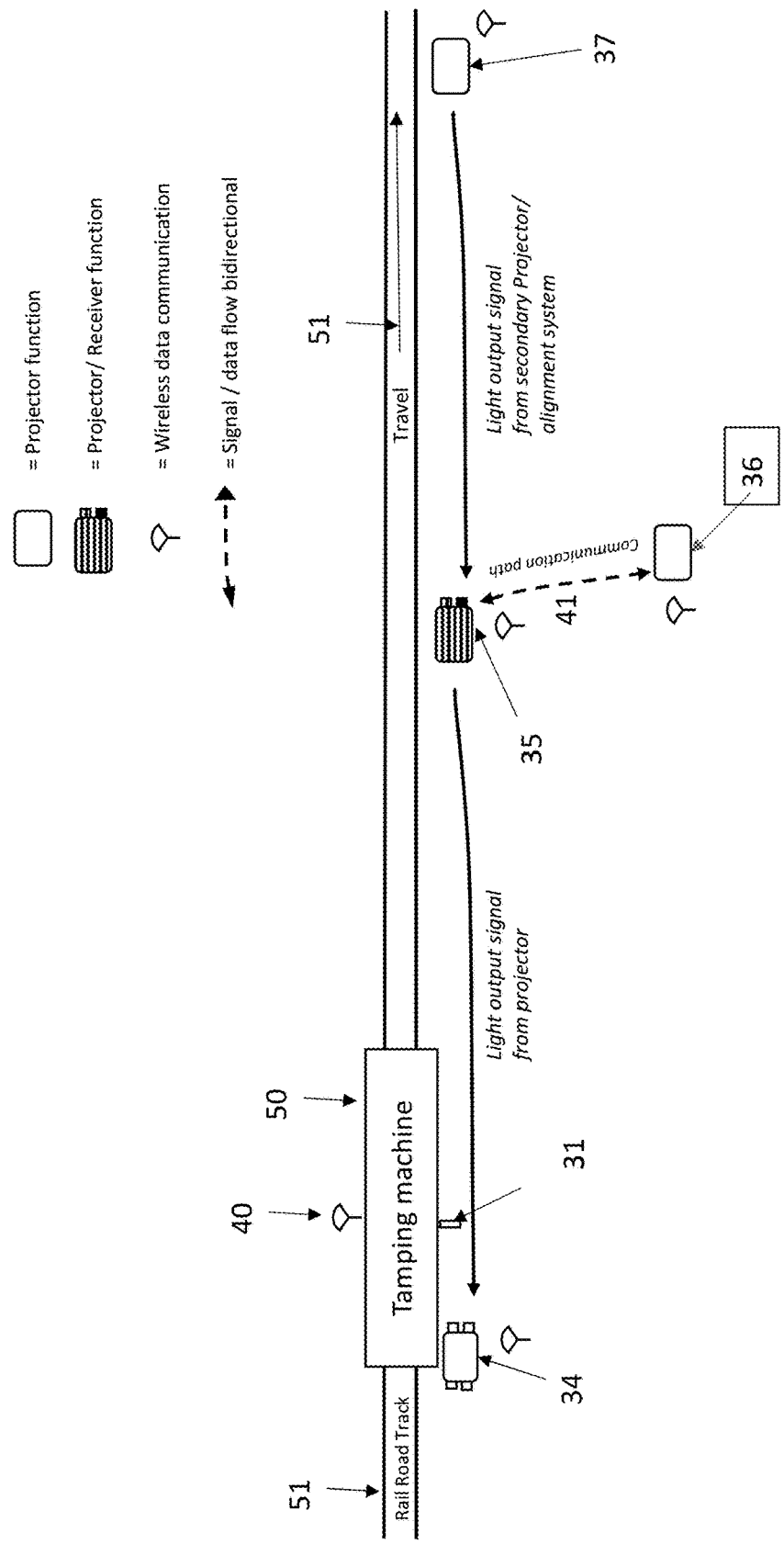
FIG. 15 depicts another exemplary component layout of a reference system.

FIG. 15 depicts an exemplary projector (35), receiver (34), and device (36) arrangement to demonstrate certain functionalities of the exemplary projectors within a system. As indicated in FIG. 15, IR receiver sensors are added in certain embodiments to the projector (35) assembly to capture expanded parametric data regarding track condition (construction, fatigue, stress, twist, level, cross level, horizontal positioning), relative track position (left/right rail), and spatial positioning relative to fixed track side reference markers, landmarks, and expanded ranging positions. In this example, a set of photo cells are positioned to view ahead of the alignment machine (50) to capture information provided from distant devices. Information (e.g., data) may be received from devices such as secondary reference system projectors or laser alignment systems (37), track side beacons or sensors (36), or communicated with the machine (50) itself, for example via wireless communication (40). Cascaded devices such as secondary light sources, laser alignment systems, fixed markers, etc. (37) are depicted. Moreover, FIG. 15 identifies certain various locations where wireless information can be sent or received within an exemplary system. Through a bi-directional wireless communication path (41) is specifically identified between the remote measurement device and the primary projector in FIG. 15, a wireless data communication path between each or any other depicted device may be incorporated. Any number and type of receiver sensors are contemplated. The location and positional direction of additional receivers and sensors (34, 35, 36) is not intended to be limited. The additional receivers or sensors (34, 35, 36) often positioned to capture relevant data at a predetermined angle and location, including capture of IR signals, if present, generated from the machine (50) (or projector (not depicted) positioned thereon) and in the direction of the machine itself. Additional IR receiver sensors (35) are often provided in the direction of the right of way (52) to provide a communication path (41, etc.) between the alignment machine (50), the projector (35), and fixed track side reference points, beacons, and sensors (36, 37). FIG. 15 is merely exemplary as any of a variety of configurations and placements of the components are contemplated.

As presented, receiver functionality is added to the projector to provide for, inter alia, a cascaded reference system to expand the total range of the reference system and the type of measurements possible within a single machine. Adding receiver functionality also provides for, for example, the use of reciprocal measurement capabilities at a forward portion (e.g., forward distant portion) of the alignment machine for the purpose of collecting track condition information directly ahead of the machine. Likewise, adding receiver functionality also provides for, for example, the use of reciprocal measurement capabilities at the rearward portion of the alignment machine for the purpose of collecting post-corrected track condition information directly behind the machine. This information can be fed back to the machine to provide a track condition analysis with enhanced granularity and detail and make the machine significantly more efficient and accurate in its calculations to determine a "new" or "correct" track position and location after tamping. Combining the receiver function into the projector along with the use of multiple IR outputs from the projector in FIGS. 16A & 16B, and use of reflector technology from FIG. 17, provides one way to collect positional data from fixed track side reference markers as the alignment machine, or most forward portion of the reference system passes such a marker.

Figure 16A:
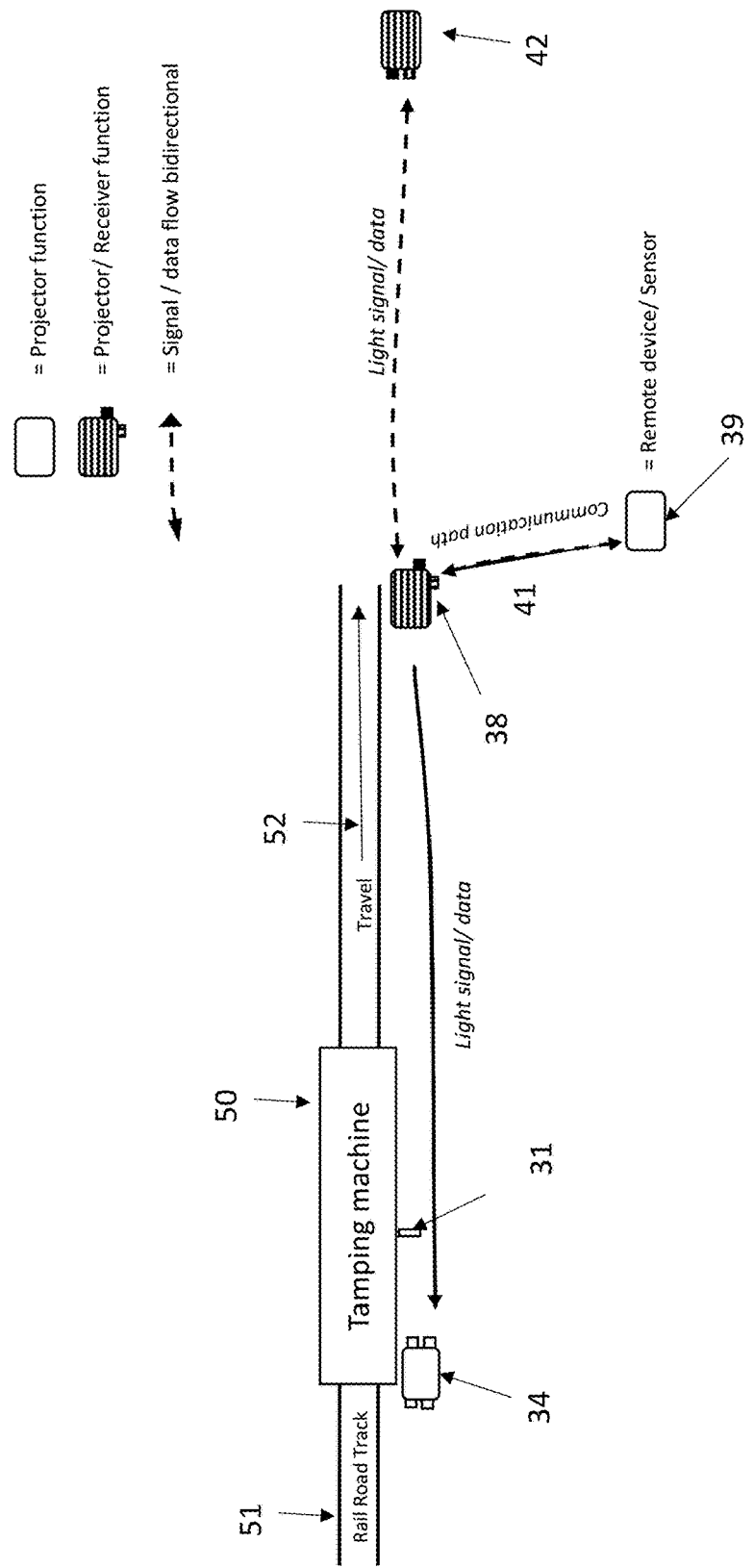
FIG. 16A depicts another exemplary component layout of a reference system.
Figure 16B:
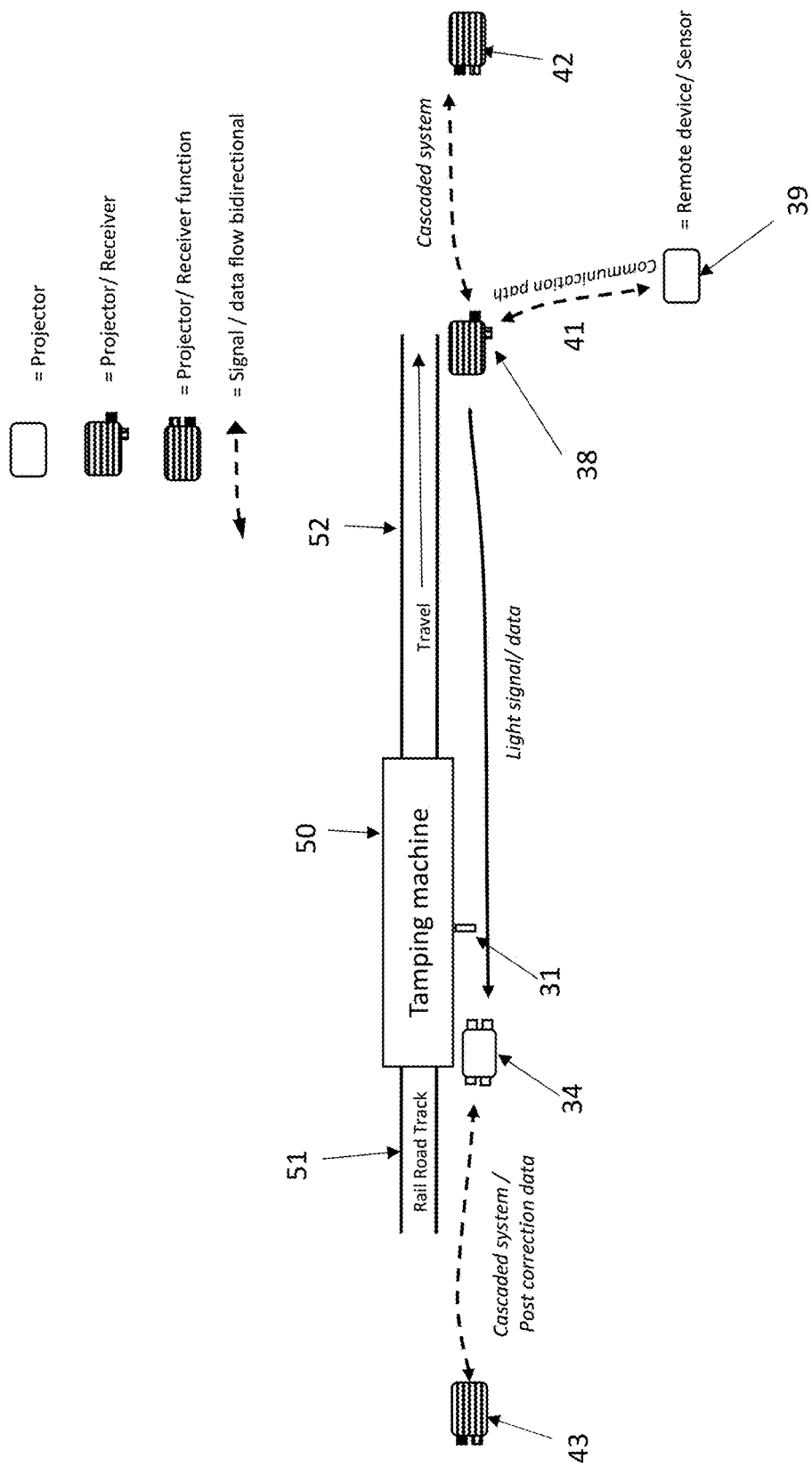
FIG. 16B depicts another exemplary component layout of a reference system.

FIGS. 16A & 16B depicts another exemplary projector (38), receiver (34), and device (39) arrangement to demonstrate certain functionalities of the exemplary projectors within a system. As provided, a projector (38) with multiple IR signal outputs is contemplated, having additional IR modulated signals directed toward remote receivers (34, 42), position sensors (39), and/or track side reference devices such as retro reflectors, and active beacon systems to provide for enhanced parametric data collection of track position. Positional data is often collected in such embodiments from one or a plurality of measurement source(s) and constitute both absolute and relative measurements from, for example: machine position, individual track (left/right position), track side reference points including bridges, crossings, buildings, tunnels, adjacent tracks, position markers, retro reflective devices, active beaconing devices, etc. Additional outputs in any quantity beyond the initial single output used in conventional reference systems are contemplated and oriented in any predetermined direction as needed to transmit and communicate with the desired remote systems. FIGS. 16A & 16B provide, for example, multiple or additional outputs to a projector. These additional outputs are often for the same light signal, a different light signal, a different modulation rate, or other output parameter or combination thereof. FIG. 16A & FIG. 16B depict multiple outputs directing additional IR signals toward both a more distant projector/receiver (including projector, receiver or projector/receiver combination device), and a track side reference marker or beacon. When included with the details outlined in connection with FIG. 15 (e.g., addition of receiver elements to a projector) it provided for communication and measurements between still more distant receivers, track side reference markers, remote sensors, or other sources of input. In certain embodiments related to FIGS. 16A & 16B, a communication loop (receiver/transmitter) is closed between distant objects. Moreover, FIGS. 16A & 16B identify certain various locations where wireless information can be sent or received within an exemplary system. Through a bi-directional wireless communication path (41) is specifically identified between various devices (e.g., between the remote measurement device and the primary projector/receiver (38), between the cascaded forward projector (42) and the primary projector/receiver (38), and between the aft/rearward projector (43) and the receiver (34)) in FIGS. 16A & 16B, a wireless data communication path between each or any other depicted device may be incorporated. As used herein the term "cascaded" refers to the relative positioning of multiple devices such as a projector, a track alignment machine, a secondary light source, a receiver, measurement device, a sensor, a reference marker, and/or a beacon. Typically, a cascaded device (e.g., 42, 43) is positioned remotely to another device in one direction or another on a railway and generally relative to the direction of travel (52) of a track alignment machine. For example, one device is positioned (or cascaded) forward of or in front of another device; or one device is positioned (or cascaded) rearward of, aft, or behind another device.

With additional regard to the cascaded system of FIG. 16B, a rearward or aft cascaded projector (43) is depicted. This projector includes a light source that communicates with the receiver (34) on the machine information related to the alignment of the track post-alignment. A separate shadow board or light mask may be employed between such a projector and the receiver. This type of information is used, for example, to provide a quality control check on the alignment process and to enhance accuracy of future alignment operations conducted by the machine, particularly those conducted at the same (or same type of) location. This type of information may additionally be used to determine whether another alignment operation needs to be conducted by the machine to correct errors or to fine-tune an alignment procedure.

Figure 17:
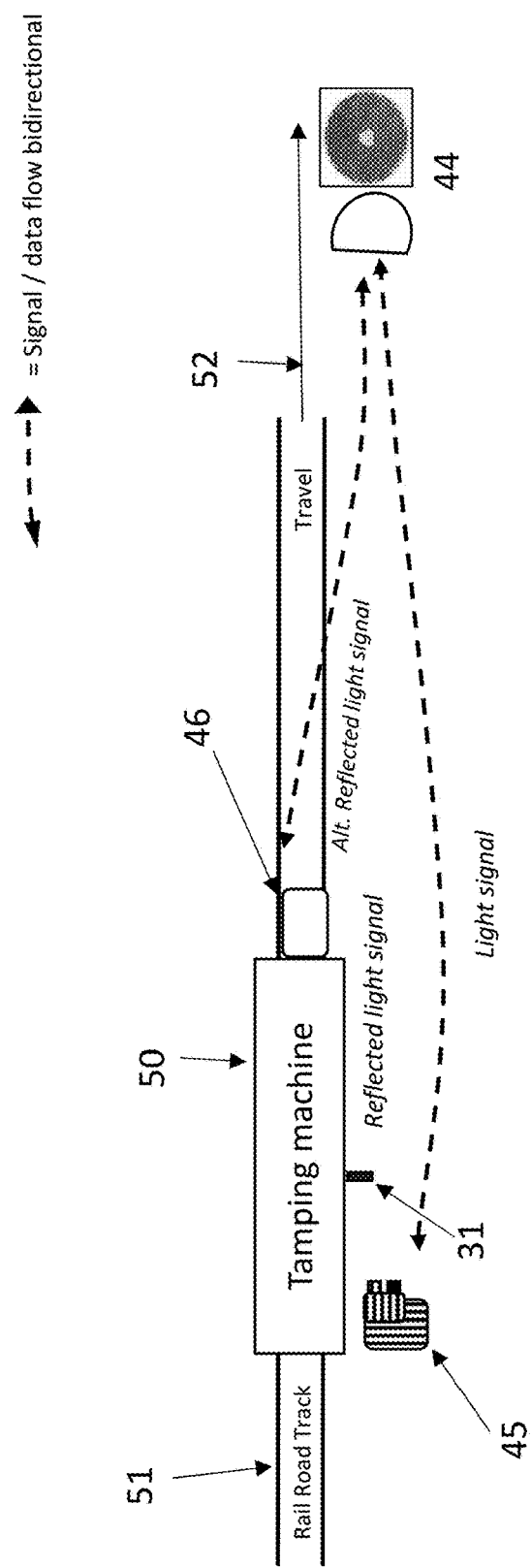
FIG. 17 depicts another exemplary component layout of a reference system.

FIG. 17 depicts another exemplary projector (46), reflector (44), and receiver (45) arrangement to demonstrate certain functionalities of exemplary projectors within a system. As provided, a reflector device (44) is employed in, for example, a conventional projector mounting location. Often in such embodiments, the projector (46) is located at/on the track alignment machine and mounted in a location and orientation to interact with the reflector (44) (e.g., emit a signal directed at the reflector) such that the signal from the projector is reflected from the reflector to a reference system receiver (45) (here the receiver is placed adjacent to the track alignment machine, though other orientations are contemplated). Employing such a reflector system has the direct advantage of reducing the complexity and costs associated with conventional powered projector systems at the distant, remote, forward buggy sections of the machine. Several machine side projector locations are considered, while only two potential locations are illustrated.

Figure 18:
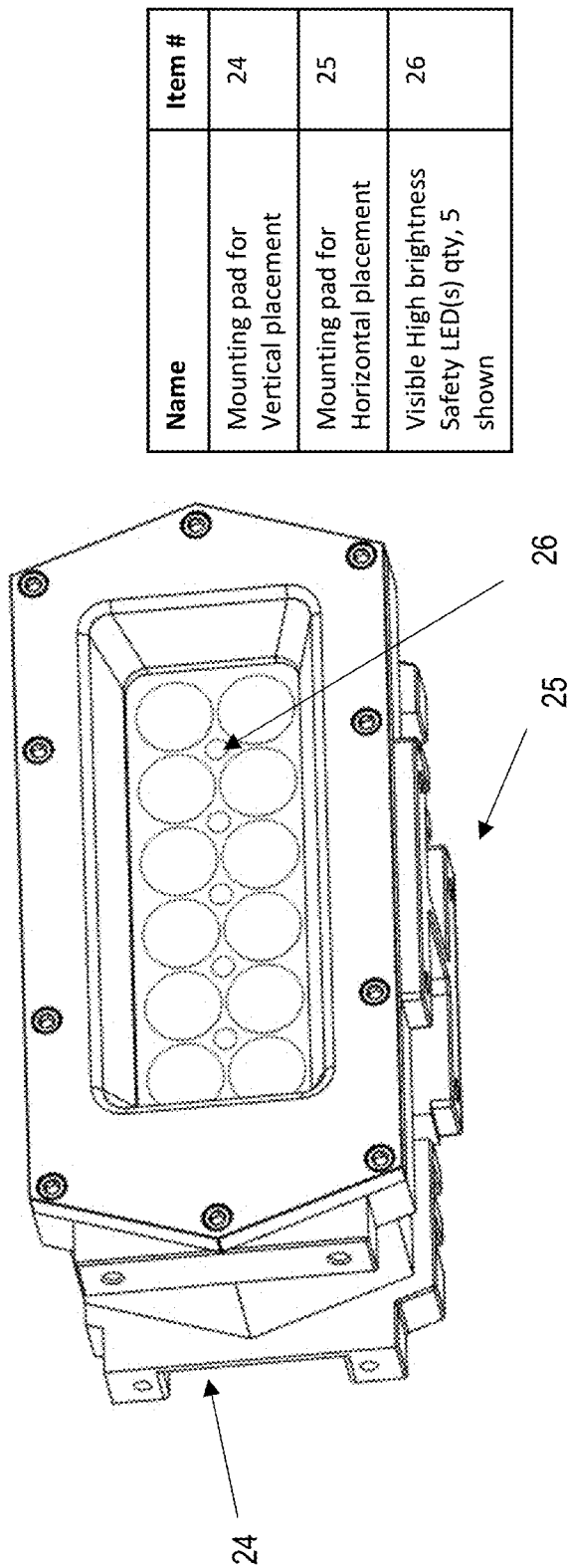
FIG. 18 depicts an exemplary projector.

FIG. 18 depicts an exemplary projector. The projector may include multiple mounting pads (24, 25) to support the housing (26) in the array orientation and provide for proper alignment of projector housing (26) for lining and/or surface functions. Providing two distinct mounting pads (24, 25) on the projector provides, for example, proper orientation and reduces or eliminates the need for two different types of mounting structures on the alignment machine. This lowers cost and complexity of the machine itself.

FIG. 18 also depicts the inclusion of high brightness safety LEDs (29) together with the light source LEDs (27). Such safety LEDs (29) are often provided to emit light in a discernable color wavelength relative to the signal of the light source LEDs (27). Often, the safety LED(s) (29) emit a red light. In particularly preferred embodiments the safety LEDs (29) are visible to an operator at an operational distance from the machine (i.e., the distance the light source would be from a receiver on the machine during a track alignment procedure). Also, the safety LEDs (29) are often visible to an operator in full sunlight Also often, the safety LEDs (29) are visible to an operator at an operational distance from the machine and in full sunlight.

One skilled in the art will appreciate further features and advantages of the presently disclosed methods, systems and devices based on the above-described embodiments. Accordingly, the presently disclosed methods, systems and devices are not to be limited by what has been particularly shown and described, except as indicated by the appended claims. All publications and references cited herein are expressly incorporated herein by reference in their entirety.

We claim:

1. A track alignment reference system projector having a modulated light source, wherein the modulated light source is configured to employ higher order modulation comprising between 5 to 25 times a base carrier frequency of 500 Hz or higher, wherein the modulated light source emits a signal comprising encoded data.

2. The track alignment reference system projector of claim 1, wherein the modulated light source operates at a base carrier frequency of 1.2 kHz.

3. The track alignment reference system projector of claim 1, wherein the modulated light source operates at an infrared carrier frequency.

4. The track alignment reference system projector of claim 1, having a linear array of two or more light sources, wherein the linear aspect ratio is between about 1.618:1 to about 20:1.

5. The track alignment reference system projector of claim 1, wherein a lens is attached or adjacent to the light source positioned in the projector.

6. A track alignment reference system projector of claim 1, wherein the light source is adapted to provide an asymmetrical beam pattern having aspect ratio of between about 1.618:1 to about 6:1.

7. The track alignment reference system projector of claim 1, wherein the projector wirelessly communicates with a receiver, one or more additional projector, an external device, or a controller on a cascaded device.

8. The track alignment reference system projector of claim 7, wherein the projector further comprises a receiver.

9. A method for use in rail track corrections, the method comprising:
   emitting a modulated light beam having an intensity from the track alignment reference system projector of claim 1 positioned on a track alignment machine;
   receiving light of substantially equal intensity and frequency at a receiver;
   triangulating a geometry of a section of track being worked; and
   comparing the geometry of the section of track being worked with a geometry of a previous or prior section of track.

10. The method of claim 9, further comprising a shadow board or light mask disposed between the projector and the receiver.

11. The system of claim 9, wherein when the receiver receives light from the projector, the track alignment machine performs a lining or leveling operation.

12. The system of claim 9, wherein when the receiver does not receive light from the projector, the track alignment machine does not perform, or stops performing, a lining or leveling operation.

* * * * *